US012384173B2

(12) United States Patent
Sakai

(10) Patent No.: US 12,384,173 B2
(45) Date of Patent: Aug. 12, 2025

(54) MEDIUM CONVEYANCE DEVICE, CONTROL METHOD, AND CONTROL PROGRAM

(71) Applicant: PFU LIMITED, Kahoku (JP)

(72) Inventor: Masaaki Sakai, Kahoku (JP)

(73) Assignee: PFU LIMITED, Kahoku (JP)

( * ) Notice: Subject to any disclaimer, the term of this patent is extended or adjusted under 35 U.S.C. 154(b) by 302 days.

(21) Appl. No.: 18/044,324

(22) PCT Filed: Oct. 20, 2020

(86) PCT No.: PCT/JP2020/039393
§ 371 (c)(1),
(2) Date: Mar. 7, 2023

(87) PCT Pub. No.: WO2022/085071
PCT Pub. Date: Apr. 28, 2022

(65) Prior Publication Data
US 2023/0331005 A1    Oct. 19, 2023

(51) Int. Cl.
*B41J 11/00* (2006.01)
*B41J 15/04* (2006.01)
*B65H 7/12* (2006.01)

(52) U.S. Cl.
CPC ........... *B41J 11/007* (2013.01); *B41J 15/046* (2013.01); *B65H 7/12* (2013.01)

(58) Field of Classification Search
CPC .... B41J 11/007; B41J 15/046; B41J 11/0095; B65H 7/12; B65H 5/062; B65H 2511/10;
(Continued)

(56) References Cited

U.S. PATENT DOCUMENTS

| 2005/0228535 A1 | 10/2005 | Simonis et al. |
| 2012/0025458 A1 | 2/2012 | Simonis et al. |

(Continued)

FOREIGN PATENT DOCUMENTS

| EP | 3141502 A1 * | 3/2017 | ............... B65H 7/02 |
| JP | H07-291485 A | 11/1995 | |

(Continued)

OTHER PUBLICATIONS

International Search Report dated Dec. 28, 2020 for corresponding PCT Application No. PCT/JP2020/039393 (3 pages) with English Translation (3 pages).

(Continued)

*Primary Examiner* — Douglas X Rodriguez
*Assistant Examiner* — Tracey M McMillion
(74) *Attorney, Agent, or Firm* — WOMBLE BOND DICKINSON (US) LLP

(57) ABSTRACT

Provided are a medium conveying apparatus, a control method, and a control program to enable determining whether multi-feed of the medium has occurred with higher accuracy. A medium conveying apparatus includes a conveying module to convey a medium, a detection module to detect transmission information of ultrasonic waves transmitted through the medium or thickness information of the medium at a plurality of positions in the medium conveyed by the conveying module, a determination module to determine whether multi-feed of the medium has occurred, by comparing a value based on the transmission information or the thickness information with a threshold, for each of the plurality of positions, and a control module to execute an abnormality process when it is determined that multi-feed of the medium has occurred. The determination module changes a determination sensitivity of whether multi-feed of the medium has occurred, according to a position in the (Continued)

medium at which the transmission information or the thickness information has been detected by the detection module.

20 Claims, 13 Drawing Sheets

(58) Field of Classification Search
CPC .......... B65H 2511/13; B65H 2511/524; B65H 2553/30; B65H 2557/61; B65H 2801/39; B65H 7/125; G03G 15/00; H04N 1/00
See application file for complete search history.

(56) References Cited

U.S. PATENT DOCUMENTS

| | | | |
|---|---|---|---|
| 2015/0048566 A1* | 2/2015 | Utagawa | B65H 3/5261 271/10.02 |
| 2017/0073179 A1* | 3/2017 | Uno | B65H 7/125 |
| 2020/0322494 A1 | 10/2020 | Seto | |

FOREIGN PATENT DOCUMENTS

| | | | | |
|---|---|---|---|---|
| JP | 2015078039 A | * | 4/2015 | |
| JP | 2020170945 A | * | 10/2020 | ......... H04N 1/00628 |

OTHER PUBLICATIONS

Written Opinion dated Dec. 28, 2020 for corresponding PCT Application No. PCT/JP2020/039393 (4 pages) with English Translation (4 pages).

International Preliminary Report on Patentability dated Apr. 13, 2023 for corresponding PCT Application No. PCT/JP2020/039393 (5 pages) with English Translation (5 pages).

Canon DR-G2140/DR-G2110 User Manual (Function details) https://gdlp01.c-wss.com/gds/6/0300031736/03/DR-G2140_G2110_User_Manual_JP.pdf p. 20, Left side, Lines L6-10 (Feb. 13, 2020: publication date), p. 131.

English Translation of Canon DR-G2140/DR-G2110/DR-G2090 User Manual https://gdlp01.c-wss.com/gds/8/0300031738/03/DR-G2140_G2110_G2090_User_Manual_EN.pdf p. 24, Left side, Lines L16-21 (p. 24, Left side, Lines L16-21 of Canon DR-G2140/DR-G2110/DR-G2090 User Manual corresponds to p. 20, Left side, Lines L6-10 of Canon DR-G2140/DR-G2110 User Manual (Function details)) (Feb. 6, 2020: publication date), p. 151.

Japanese Office Action dated May 24, 2023 regarding Japanese Patent Application No. 2022-556854 corresponding to U.S. Appl. No. 18/044,324 (3 pages) with English Translation (5 pages).

* cited by examiner

| AREA IN MEDIUM | SENSITIVITY SETTING VALUE | SENSITIVITY INITIAL VALUE | ... |
|---|---|---|---|
| (xs1,ys1)-(xe1,ye1) | (s11,s12, ...) | (i11,i12, ...) | ... |
| (xs2,ys2)-(xe2,ye2) | (s21,s22, ...) | (i21,i22, ...) | ... |
| (xs3,ys3)-(xe3,ye3) | (s31,s32, ...) | (i31,i32, ...) | ... |
| (xs4,ys4)-(xe4,ye4) | (s41,s42, ...) | (i41,i42, ...) | ... |
| (xs5,ys5)-(xe5,ye5) | (s51,s52, ...) | (i51,i52, ...) | ... |
| ... | ... | ... | ... |

MEDIUM CONVEYANCE DEVICE, CONTROL METHOD, AND CONTROL PROGRAM

CROSS-REFERENCE TO RELATED APPLICATION(S)

This application is a U.S. National Phase Patent Application and claims priority to and the benefit of International Application Number PCT/JP2020/039393, filed on Oct. 20, 2020, the entire content of which is incorporated herein by reference.

FIELD

The present disclosure relates to a medium conveying apparatus, in particular, a medium conveying apparatus to determine whether multi-feed of a medium has occurred.

BACKGROUND

In general, a medium conveying apparatus such as a scanner has a function of detecting whether or not multi-feed, i.e., a plurality of media being conveyed in an overlapping manner has occurred, and automatically stopping the conveyance of the medium when multi-feed has occurred. However, even when a medium to which a photograph is adhered, such as a resume, is conveyed, the medium conveying apparatus may determine that multi-feed has occurred, and stop the conveyance. Therefore, when a user causes the medium conveying apparatus to scan the medium to which the photograph is adhered, the user needs to set the detection function of multi-feed to OFF before the conveyance of the medium, whereby convenience to the user is impaired.

A multi-feed detecting apparatus including a conveying roller to convey a document and a driven roller pressed against the conveying roller with a predetermined biasing force and displaced according to a thickness of the document is disclosed (see Patent Literature 1). The multi-feed detecting apparatus controls to prohibit the multi-feed determination when a time for which a displacement amount of the driven roller is increased, which is detected while the document passes between the two rollers is shorter than a predetermined time A method of receiving a processed object and detecting multi-feed of the object is disclosed (see Patent Literature 2) In this method, it is determined whether or not an overlap position of multi-feed of the object is within an allowable range, and the processing of the object is continued when the position is within a predetermined overlap criterion, and the processing of the object is aborted when the position is not within the predetermined overlap criterion.

CITATION LIST

Patent Literature

Patent Literature 1: Japanese Unexamined Patent Publication No. H7-291485 Patent Literature 2: US 2005/0228535

SUMMARY

It is desired for the medium conveying apparatus to determine whether multi-feed of the medium has occurred with higher accuracy.

An object of the medium conveying apparatus, the control method and the control program is to enable determining whether multi-feed of the medium has occurred with higher accuracy.

According to some embodiments, a medium conveying apparatus includes a conveying module to convey a medium, a detection module to detect transmission information of ultrasonic waves transmitted through the medium or thickness information of the medium at a plurality of positions in the medium conveyed by the conveying module, a determination module to determine whether multi-feed of the medium has occurred, by comparing a value based on the transmission information or the thickness information with a threshold, for each of the plurality of positions, and a control module to execute an abnormality process when it is determined that multi-feed of the medium has occurred. The determination module changes a determination sensitivity of whether multi-feed of the medium has occurred, according to a position in the medium at which the transmission information or the thickness information has been detected by the detection module.

According to some embodiments, a control method of a medium conveying apparatus including a conveying module to convey a medium, includes detecting transmission information of ultrasonic waves transmitted through the medium or thickness information of the medium at a plurality of positions in the medium conveyed by the conveying module, determining whether multi-feed of the medium has occurred, by comparing a value based on the transmission information or the thickness information with a threshold, for each of the plurality of positions, and executing an abnormality process when it is determined that multi-feed of the medium has occurred. A determination sensitivity of whether multi-feed of the medium has occurred is changed, according to a position in the medium at which the transmission information or the thickness information has been detected.

According to some embodiments, a control program of a medium conveying apparatus including a conveying module to convey a medium, causes the medium conveying apparatus to execute detecting transmission information of ultrasonic waves transmitted through the medium or thickness information of the medium at a plurality of positions in the medium conveyed by the conveying module, determining whether multi-feed of the medium has occurred, by comparing a value based on the transmission information or the thickness information with a threshold, for each of the plurality of positions, and executing an abnormality process when it is determined that multi-feed of the medium has occurred. A determination sensitivity of whether multi-feed of the medium has occurred is changed, according to a position in the medium at which the transmission information or the thickness information has been detected.

According to the embodiments, the medium conveying apparatus, the control method and the control program can determine whether multi-feed of the medium has occurred with higher accuracy.

The object and advantages of the invention will be realized and attained by means of the elements and combinations, in particular, described in the claims. It is to be understood that both the foregoing general description and the following detailed description are exemplary and explanatory, and are not restrictive of the invention, as claimed.

DESCRIPTION OF EMBODIMENTS

Hereinafter, a medium conveying apparatus, a control method and a control program according to an embodiment, will be described with reference to the drawings. However, it should be noted that the technical scope of the invention is not limited to these embodiments, and extends to the inventions described in the claims and their equivalents.

Figure 1:
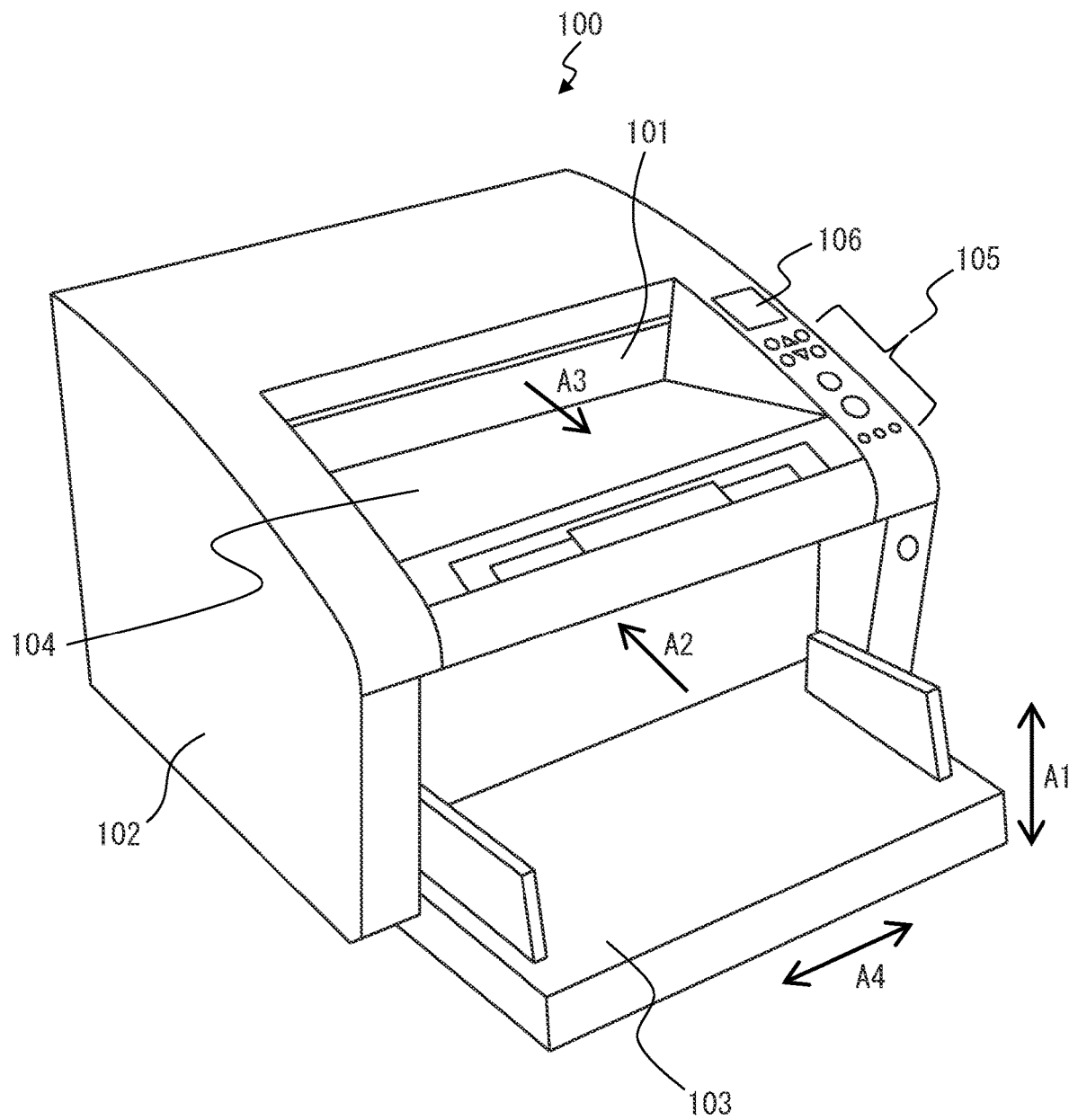
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. The medium is a paper, a thick paper, a card, etc. The medium conveying apparatus 100 may be a fax machine, a copying machine, a multifunctional peripheral (MFP), etc. A conveyed medium may not be a document but may be an object being printed on etc., and the medium conveying apparatus 100 may be a printer etc.

The medium conveying apparatus 100 includes a first housing 101, a second housing 102, a medium tray 103, an ejection tray 104, an operation device 105 and a display device 106, etc.

The first housing 101 is located on an upper side of the medium conveying apparatus 100 and is engaged with the second housing 102 by hinges so as to be opened and closed at a time of medium jam, during cleaning the inside of the medium conveying apparatus 100, etc.

The medium tray 103 is engaged with the second housing 102 in such a way as to be able to place a medium to be conveyed. The medium tray 103 is provided on a side surface of the second housing 102 on a medium supply side to be movable in a substantially vertical direction (height direction) A1 by a motor (not shown). The medium tray 103 is located at a position of a lower end to easily place a medium on the medium tray 103 when the medium is not conveyed, and lifts to a position at which the medium placed on the uppermost side is in contact with a pick roller to be described later when the medium is conveyed. The ejection tray 104 is formed on the first housing 101 capable of holding the ejected medium, to load the ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

In FIG. 1, an arrow A2 indicates a medium conveying direction, an arrow A3 indicates a medium ejecting direction, and an arrow A4 indicates a width direction perpendicular to the medium conveying direction. Hereinafter, upstream refers to upstream of the medium conveying direction A2 or the medium ejecting direction A3, downstream refers to downstream of the medium conveying direction A2 or the medium ejecting direction A3.

Figure 2:
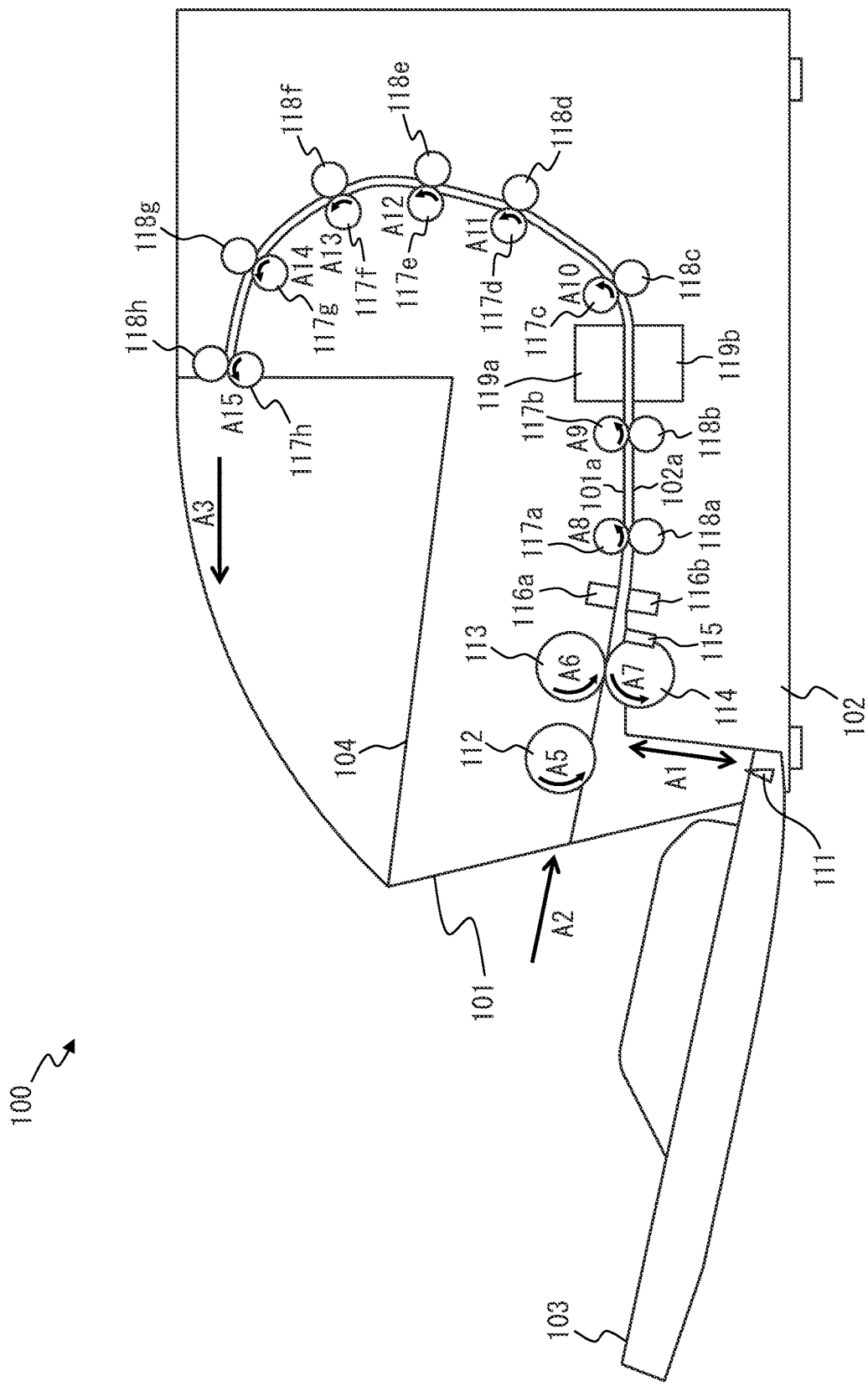
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a first medium sensor 111, a pick roller 112, a feed roller 113, a brake roller 114, a second medium sensor 115, an ultrasonic transmitter 116a, an ultrasonic receiver 116b, first to eighth conveyance rollers 117a to 117h, first to eighth driven rollers 118a to 118h, a first imaging device 119a and a second imaging device 119b, etc.

The pick roller 112, the feed roller 113, the brake roller 114, the first to eighth conveyance rollers 117a to 117h, and the first to eighth driven rollers 118a to 118h are examples of a conveying module to convey the medium. The number of each of the pick roller 112, the feed roller 113, the brake roller 114, the first to eighth conveyance rollers 117a to 117h, and/or the first to eighth driven rollers 118a to 118h is not limited to one, and may be plural. In that case, the plurality of pick rollers 112, the feed rollers 113, the brake rollers 114, the first to eighth conveyance rollers 117a to 117h and/or the first to eighth driven rollers 118a to 118h are spaced and located along in the width direction A4, respectively. Hereinafter, the first imaging device 119a and the second imaging device 119b may be collectively referred to as imaging devices 119.

The surface of the first housing 101 facing the second housing 102 forms a first guide 101a of the medium conveyance path, and the surface of the second housing 102 facing the first housing 101 forms a second guide 102a of the medium conveyance path.

The first medium sensor 111 is located on the medium tray 103, i.e., on the upstream side of the feed roller 113 and the brake roller 114, to detect a placing state of the medium in the medium tray 103. The first medium sensor 111 determines whether or not the medium is placed on the medium tray 103, by a contact detection sensor to pass a predetermined current when a medium is in contact or a medium is not in contact. The first medium sensor 111 generates and outputs a medium detection signal changing the signal value between a state in which a medium is placed on the medium tray 103 and a state in which a medium is not placed.

The pick roller 112 is provided in the first housing 101, and comes into contact with the medium placed on the medium tray 103 lifted to a height substantially equal to that of the medium conveyance path to feed the medium to the downstream side.

The feed roller 113 is located in the first housing 101, and on the downstream side of the pick roller 112, to feed the medium placed on the medium tray 103 and fed by the pick roller 112 toward the further downstream side. The brake roller 114 is located in the second housing 102 and is located to face the feed roller 113. The feed roller 113 and the brake roller 114 perform a medium separation operation to separate the media and feed them one by one. The feed roller 113 is located on the upper side with respect to the brake roller 114, the medium conveying apparatus 100 feeds the medium by a so-called top-first type.

The second medium sensor 115 is located on the downstream side of the feed roller 113 and the brake roller 114 and on the upstream side of the ultrasonic transmitter 116a and the ultrasonic receiver 116b. The second medium sensor 115 detects whether or not the medium exists at the second medium sensor 115. The second medium sensor 115 includes a light emitter and a light receiver provided on one side with respect to the conveyance path of the medium, and a reflection member such as a mirror provided at a position facing the light emitter and the light receiver across the conveyance path. The light emitter emits light toward the conveyance path. On the other hand, the light receiver receives light projected by the light emitter and reflected by the reflection member, and generates and outputs a second medium signal being an electric signal based on intensity of the received light. Since the light emitted by the light emitter is shielded by the medium when the medium exists at the position of the second medium sensor 115, a signal value of the second medium signal is changed in a state in which the medium exists at the position of the second medium sensor 115 and a state in which a medium does not exist at the position. The light emitter and the light receiver may be provided at positions facing one another with the conveyance path in between, and the reflection member may be omitted.

The ultrasonic transmitter 116a and the ultrasonic receiver 116b are located on the downstream side of the feed roller 113 and the brake roller 114 and on the upstream side of the first to eighth conveyance rollers 117a to 117h and the first to eighth driven rollers 118a to 118h. The ultrasonic transmitter 116a and the ultrasonic receiver 116b are located close to the conveyance path of the medium in such a way as to face one another with the conveyance path in between. The ultrasonic transmitter 116a outputs an ultrasonic wave. On the other hand, the ultrasonic receiver 116b receives the ultrasonic wave transmitted by the ultrasonic transmitter 116a and passing through the medium, and generates and outputs an ultrasonic signal being an electric signal corresponding to the received ultrasonic wave. The ultrasonic signal indicates a transmission information of the ultrasonic waves transmitted through the medium at a plurality of positions in the medium conveyed by the conveying module. The transmission information indicates the magnitude of the ultrasonic wave received by the ultrasonic receiver 116b. Hereinafter, the ultrasonic transmitter 116a and the ultrasonic receiver 116b may be collectively referred to as an ultrasonic sensor 116.

The first to eighth conveyance rollers 117a to 117h and the first to eighth driven rollers 118a to 118h are provided on the downstream side of the feed roller 113 and the brake roller 114, to convey the medium fed by the feed roller 113 and the brake roller 114 toward the downstream side. The first to eighth conveyance rollers 117a to 117h and the first to eighth driven rollers 118a to 118h are located to face each other with the medium conveyance path in between.

The first imaging device 119a is an example of an imaging device, and is provided on the downstream side of the first conveying roller 117a and the first driven roller 118a in the medium conveying direction A2, i.e., on the downstream side of the ultrasonic sensor 116. The first imaging device 119a includes a line sensor based on a unity-magnification optical system type contact image sensor (CIS) including an imaging element based on a complementary metal oxide semiconductor (CMOS) linearly located in a main scanning direction. Further, the first imaging device 119a includes a lens for forming an image on the imaging element, and an A/D converter for amplifying and analog-digital (A/D) converting an electric signal output from the imaging element. The first image pickup device 119a generates and outputs an input image by imaging a front side of the conveyed medium.

Similarly, the second imaging device 119b is an example of an imaging device, and is provided on the downstream side of the first conveying roller 117a and the first driven roller 118a in the medium conveying direction A2. The secondary imaging device 119b includes a line sensor based on a unity-magnification optical system type CIS including an imaging element based on a CMOS linearly located in a main scanning direction. Further, the second imaging device 119b includes a lens for forming an image on the image element, and an A/D converter for amplifying and analog-digital (A/D) converting an electric signal output from the imaging element. The secondary imaging device 119b generates and outputs an input image by imaging a back side of the conveyed medium.

Only either of the first imaging device 119a and the second imaging device 119b may be located in the medium conveying apparatus 100 and only one side of a medium may be read. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs.

A medium placed on the medium tray 103 is conveyed in the medium conveying direction A2 between the first guide 101a and the second guide 102a by the pick roller 112 rotating in a medium feeding direction A5 and the feed roller 113 rotating in a medium feeding direction A6. On the other hand, when a plurality of media are placed on the medium tray 103, only a medium in contact with the feed roller 113, out of the media placed on the medium tray 103 is separated, by the brake roller 114 rotating in a direction A7 opposite to the medium feeding direction.

While being guided by the first guide 101a and the second guide 102a, the medium is fed to the imaging position of the imaging device 119 by the first to second conveyance rollers 117a to 117b rotating in directions of arrows A8 to A9, and is imaged by the imaging device 119. The medium is ejected on the ejection tray 104 by the third to eighth conveyance rollers 117c to 117h rotating in directions of arrows A10 to A15, respectively. The ejection tray 104 loads the medium ejected by the eighth conveyance roller 117h.

Figure 3:
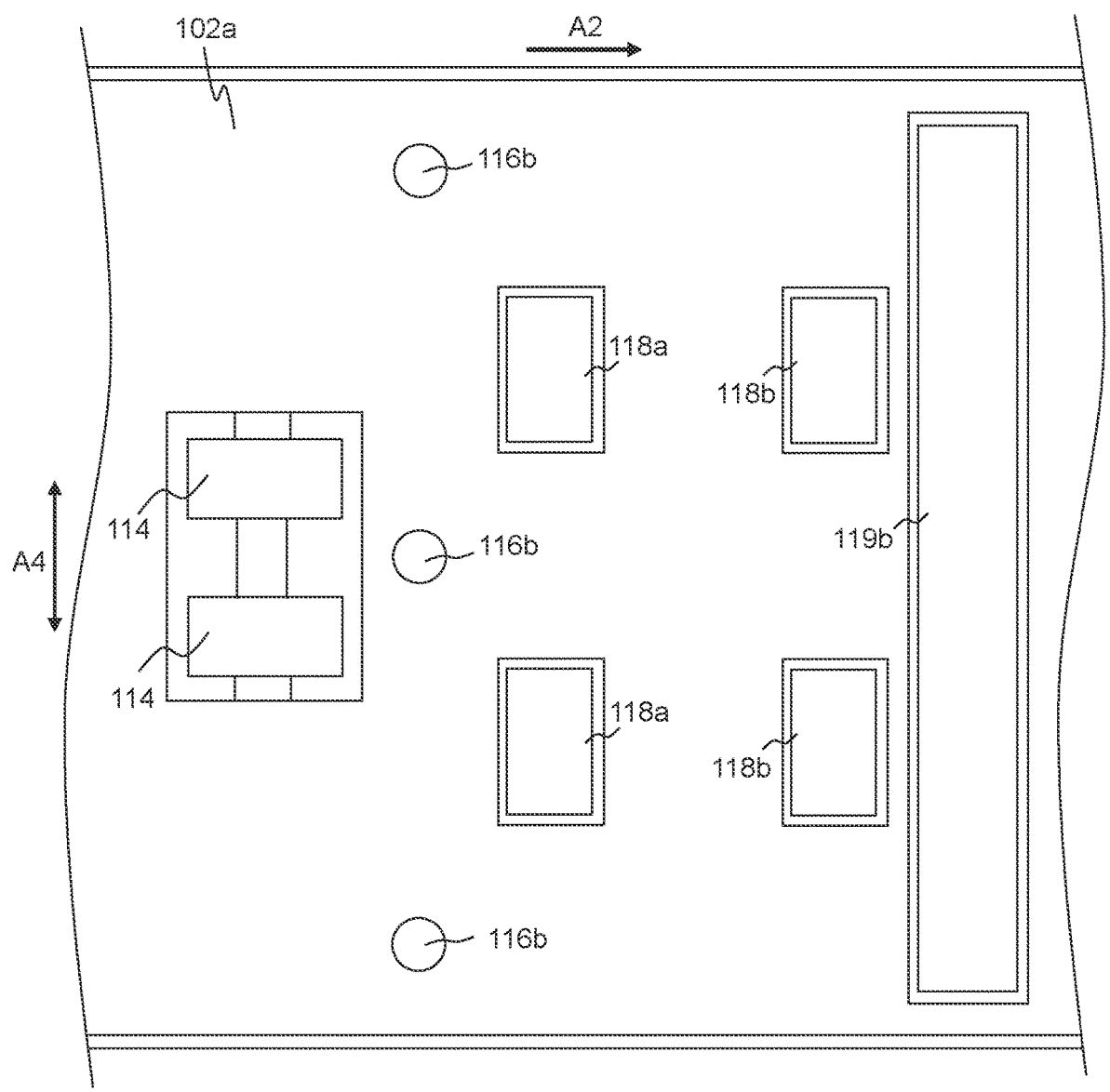
FIG. 3 is a schematic diagram for illustrating an arrangement of an ultrasonic sensor 116.

FIG. 3 is a schematic diagram for illustrating an arrangement of the ultrasonic sensor 116. FIG. 3 is a schematic diagram of the second housing 102 as viewed from above in a state in which the first housing 101 is opened.

In the example shown in FIG. 3, a plurality of ultrasonic sensors 116 are spaced and located along in the width direction A4, respectively. The ultrasonic sensor 116 in a central portion is located at a substantially central position in the width direction A4, and the ultrasonic sensors 116 at both ends are located at positions at which both ends of the imaging device 119 are overlapped in the width direction A4. The arrangement position of the ultrasonic sensors 116 is not limited to the above, the ultrasonic sensors 116 may be located at any position at which each ultrasonic sensor 116 is not overlapped in the width direction A4. The number of ultrasonic sensors 116 is not limited to three, and may be any number of one or more.

Figure 4:
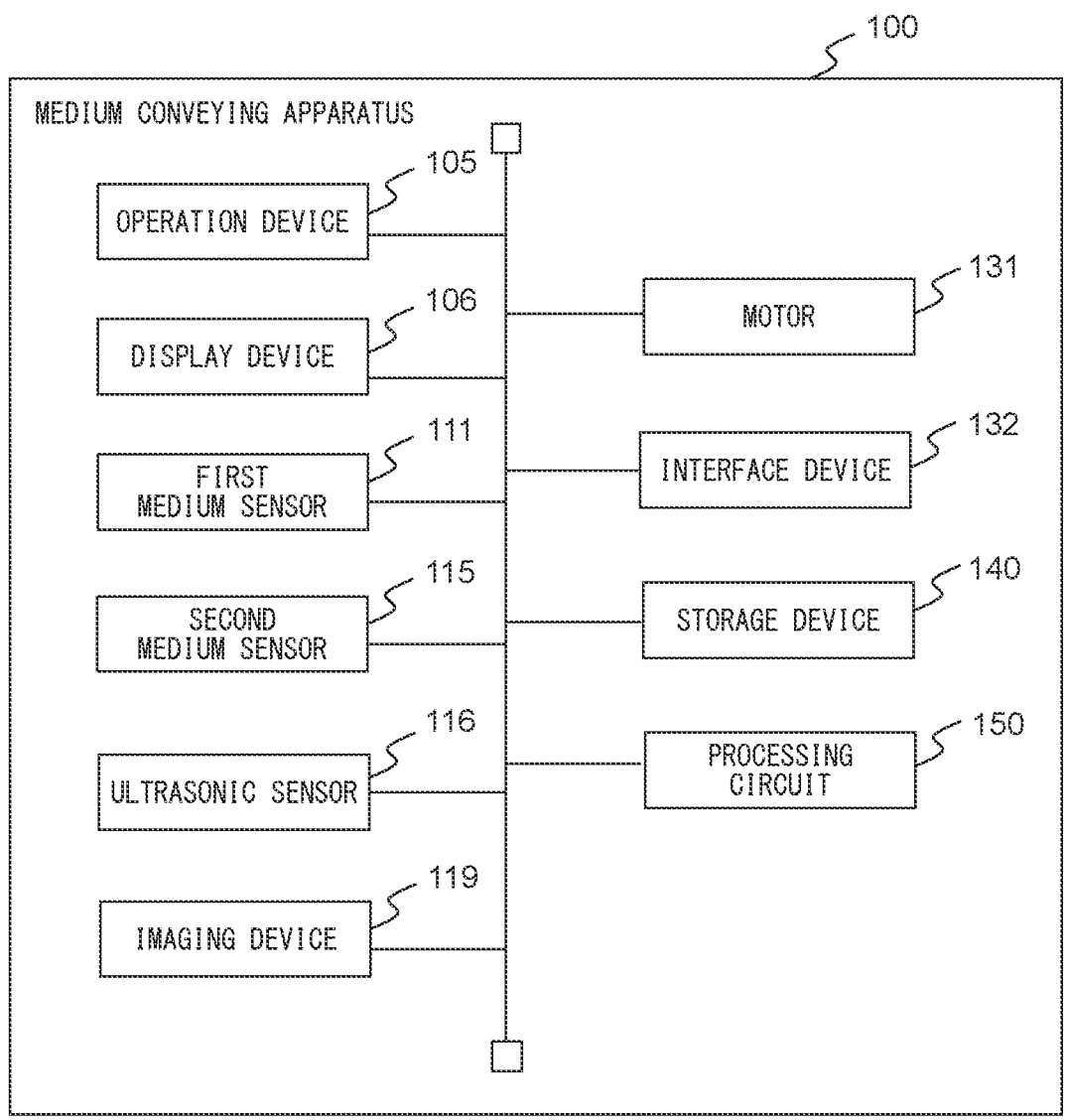
FIG. 4 is a block diagram illustrating a schematic configuration of the medium conveying apparatus 100.

FIG. 4 is a block diagram illustrating a schematic configuration of the medium conveying apparatus 100.

The medium conveying apparatus 100 further includes a motor 131, an interface device 132, a storage device 140, and a processing circuit 150, etc., in addition to the configuration described above.

The motor 131 includes one or more motors and rotates the pick roller 112, the feed roller 113, the brake roller 114, and the first to eighth conveyance rollers 117a to 117h by a control signal from the processing circuit 150 to feed and convey the medium. The first to eighth driven rollers 118a to 118h may be provided to rotate by the driving force from the motor rather than to be driven to rotate according to the rotation of each conveyance roller.

The interface device 132 includes, for example, an interface circuit conforming to a serial bus such as universal serial bus (USB), is electrically connected to an unillustrated information processing apparatus (for example, a personal computer or a mobile information terminal), and transmits and receives an input image and various types of information. Further, a communication device including an antenna transmitting and receiving wireless signals, and a wireless communication interface circuit for transmitting and receiving signals through a wireless communication line in conformance with a predetermined communication protocol may be used in place of the interface device 132. For example, the predetermined communication protocol is a wireless local area network (LAN).

The storage device 140 includes a memory device such as a random access memory (RAM) or a read only memory (ROM), a fixed disk device such as a hard disk, or a portable storage device such as a flexible disk or an optical disk. Further, the storage device 140 stores a computer program, a database, a table, etc., used for various types of processing in the medium conveying apparatus 100. The computer program may be installed on the storage device 140 from a computer-readable, non-transitory medium such as a compact disc read only memory (CD-ROM), a digital versatile disc read only memory (DVD-ROM), etc., by using a well-known setup program, etc.

The storage device 140 stores, as data, a setting table for setting a determination sensitivity of multi-feed of the medium. Details of the setting table will be described later. The storage device 140 is an example of a storage module.

The processing circuit 150 operates in accordance with a program previously stored in the storage device 140. The processing circuit 150 is, for example, a CPU (Central Processing Unit). The processing circuit 150 may be a digital signal processor (DSP), a large scale integration (LSI), an application specific integrated circuit (ASIC), a field-programmable gate array (FPGA), etc.

The processing circuit 150 is connected to the operation device 105, the display device 106, the first medium sensor 111, the second medium sensor 115, the ultrasonic sensor 116, the imaging device 119, the motor 131, the interface device 132 and the storage device 140, etc., and controls each of these units. The processing circuit 150 controls the motor 131 to convey the medium, controls the imaging device 119 to acquire an input image, and transmits the acquired input image to the information processing apparatus via the interface device 132. Further, the processing circuit 150 determines whether or not multi-feed of the medium has occurred based on the ultrasonic signal received from the ultrasonic sensor 116. The processing circuit 150 changes the determination sensitivity of whether or not multi-feed of the medium has occurred according to the position in the medium.

Figures 5, 6:
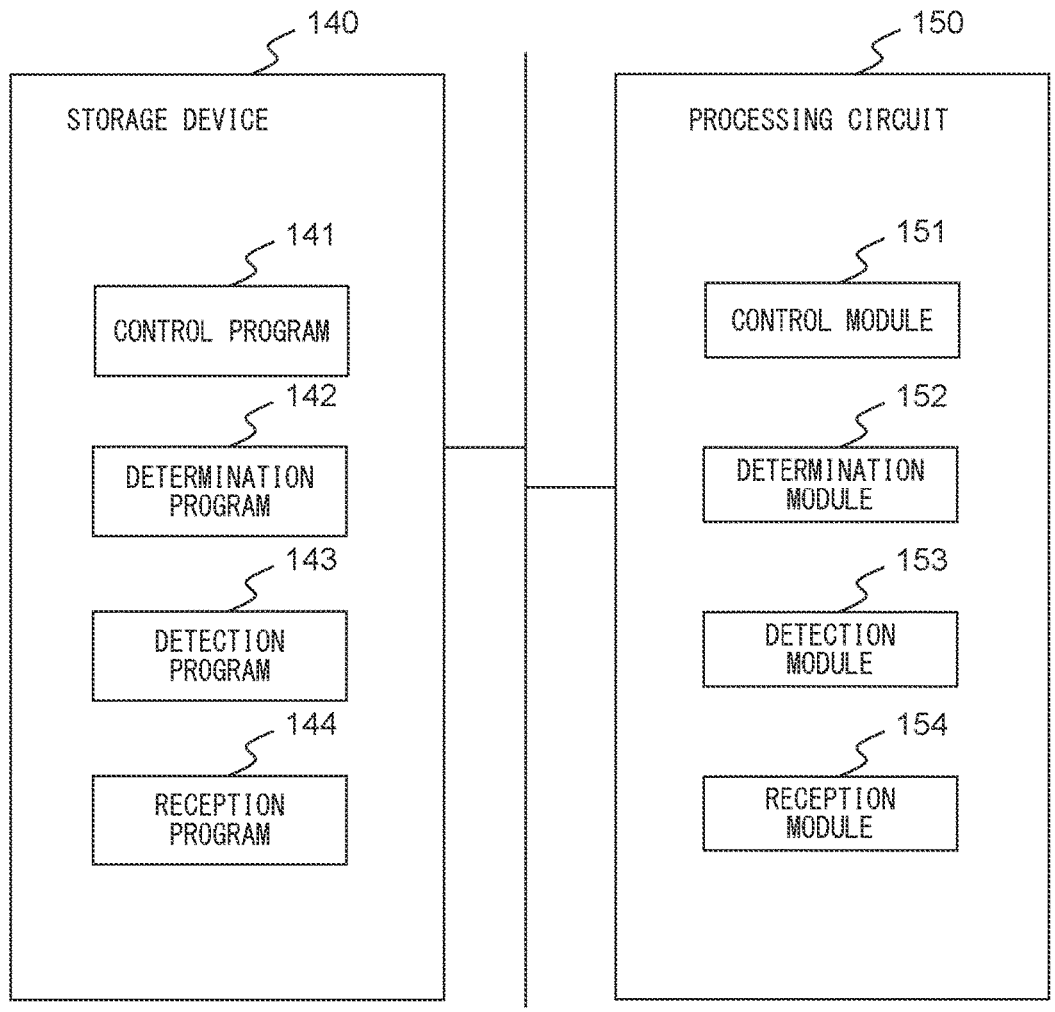
FIG. 5 is a diagram illustrating schematic configurations of a storage device 140 and a processing circuit 150.
FIG. 6 is a diagram illustrating an example of a data structure of a setting table.

FIG. 5 is a diagram illustrating schematic configurations of the storage device 140 and the processing circuit 150.

As shown in FIG. 5, each program such as a control program 141, a determination program 142, a detection program 143 and a reception program 144, etc., is stored in the storage device 140. Each of these programs is a functional module implemented by software operating on a processor. The processing circuit 150 reads each program stored in the storage device 140 and operates in accordance with the read programs, to function as a control module 151, a determination module 152, a detection module 153 and a reception module 154.

FIG. 6 is a diagram illustrating an example of a data structure of the setting table.

As shown in FIG. 6, in the setting table, for a plurality of areas in the conveyed medium, a sensitivity setting value and a sensitivity initial value are stored in association with each other. Each area in the medium is defined, for example, by coordinates in a coordinate system with the medium conveying direction A2 and the width direction A4 as the coordinate axes and with a particular corner of the medium as the origin. Each area is, for example, a rectangular area, and indicated by a position of a particular corner and an opposite corner (having an opposite angle) of the particular corner in the medium. Since a size of the conveyed medium is not necessarily constant, each position is defined by a relative position to either end portion of the medium. Each area may be an area having any other shape, such as a triangle, a circle or an elliptic. In that case, each area is indicated by a coordinate group corresponding to each position in each area. Each area may be in contact with each other or may be spaced apart.

The sensitivity setting value is a setting value of a parameter for changing a determination sensitivity for determining whether or not multi-feed of the medium has occurred. The parameter for changing the determination sensitivity includes a determination threshold, a determination interval, a calculation time and a determination period, etc. The determination threshold is an example of a threshold, and is a threshold for determining whether or not multi-feed of the medium has occurred, by being compared with a measured value for the conveyed medium or a statistical value calculated from the measured value. The determination interval is an example of a predetermined interval, and is an execution interval of processes of comparing the measured value for the conveyed medium and the determination threshold. In other words, the determination interval is an interval for which the ultrasonic transmitter 116a transmits the ultrasonic wave, and is an interval for which the processing circuit 150 receives the ultrasonic signal from the ultrasonic sensor 116. The calculation time is an example of a predetermined time, and is a time for calculating the statistical value from the measured value measured within the time. The determination period is an example of a predetermined period, and is a period for determining that multi-feed of the medium has occurred when overlap of the medium is detected continuously for the period. The determination period is set to a period corresponding to a length in the medium conveying direction A2 of the medium in which multi-feed of the medium is determined to be occurring.

The sensitivity initial value is an initial value of the sensitivity setting value. The sensitivity setting value is set to the sensitivity initial value, immediately after shipment of the medium conveying apparatus 100, or when the setting is reset by the user.

Figure 7:
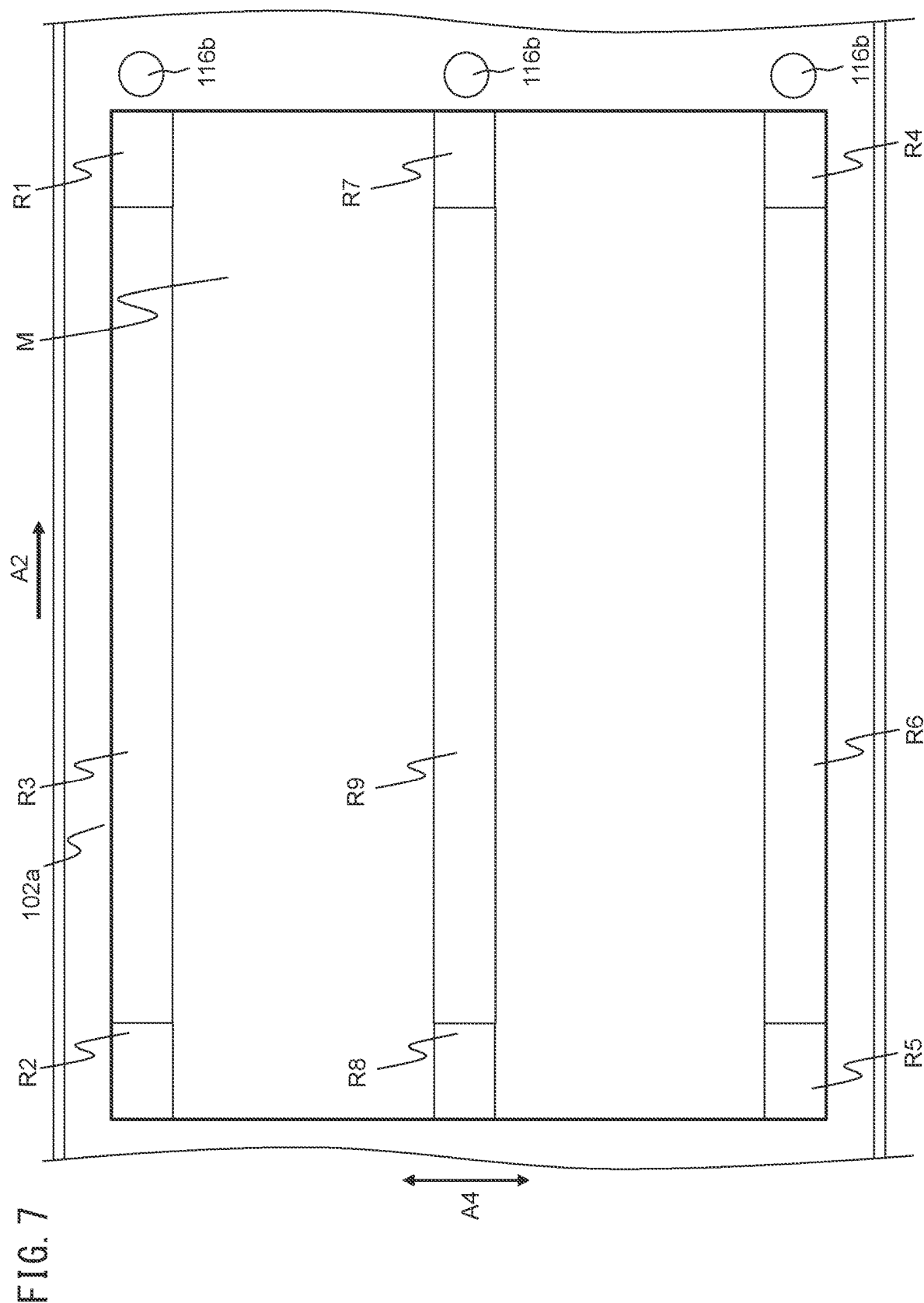
FIG. 7 is a schematic diagram for illustrating an area in a medium in which a determination sensitivity is set.

FIG. 7 is a schematic diagram for illustrating the area in the medium in which the determination sensitivity is set.

FIG. 7 is a schematic diagram of the second housing 102 as viewed from above in a state in which the first housing 101 is opened. In the example shown in FIG. 7, the medium M is located on the upstream side of the ultrasonic sensor 116. As shown in FIG. 7, the area in the medium M is classified to areas R1, R2, R3 of an end portion on one end side, areas R4, R5, R6 of an end portion on the other end side, and areas R7, R8, R9 of a central portion, in the width direction A4. The areas R1, R2, R3 of the end portion on the one end side are set to areas corresponding to (overlapping) the arrangement position of the ultrasonic sensor 116 on the one end side. The areas R4, R5, R6 of the end portion on the other end side are set to areas corresponding to the arrangement position of the ultrasonic sensor 116 on the other end side. The areas R7, R8, R9 of the central portion are set to areas corresponding to the arrangement position of the ultrasonic sensor 116 in the central portion.

Further, the area in the medium M is classified to the areas R1, R4, R7 of an end portion on the front end side (downstream side), the areas R2, R5, R8 of an end portion on the rear end side (upstream side), and the areas R3, R6, R9 of the central portion, in the medium conveying direction A2. The areas R1, R4, R7 of the end portion on the front end side are set to ranges within a predetermined range from the front end of the medium, the areas R2, R5, R8 of the end portion on the rear end side are set to ranges within a predetermined range from the rear end of the medium, and the areas R3, R6, R9 of the central portion are set to ranges between the area of the end portion on the front end side and the area of the end portion on the rear end side. The predetermined range is set to a range where the end portions of the two media fed continuously are likely to overlap without being separated. The number of areas set in the medium M is not limited to nine, and may be two or more. Each area may be set by a user using the operating device 105 or the information processing apparatus.

For each of the set plurality of areas R1 to R9, the determination sensitivity is set. For example, when stapled media or a medium whose front end is folded, is conveyed, the medium may be damaged by continuing the conveyance. Further, when the stapled media are conveyed, the medium conveying apparatus 100 may be damaged by the staple. Therefore, when the stapled media are conveyed, or when the medium whose front end is folded, is conveyed, the medium conveying apparatus 100 needs to detect multi-feed of the medium at an early stage and stop the conveyance of the medium. Therefore, the determination sensitivity of each area is set so that the determination sensitivity of the end portion on the front end side of the medium is higher than the determination sensitivity of the center portion of the medium and/or the end portion on the rear end side of the medium, in the medium conveying direction A2, i.e., so that it is easily determined that multi-feed of the medium has occurred in the end portion on the front end side of the medium than the center portion of the medium and/or the end portion on the rear end side of the medium.

Further, after the front ends are well separated by the feed roller 113 and the brake roller 114, the frictional force between the ted medium and a medium in contact with the fed medium becomes larger than the separation force by the feed roller 113 and the brake roller 114, and thereby, multi-feed may occur. In this case, multi-feed may not occur in the central portion of the fed medium, and multi-feed may occur only in the rear end of the medium. In order to reliably detect such multi-feed, the determination sensitivity of each area is set so that the determination sensitivity in the end portion on the rear end side of the medium is higher than the determination sensitivity in the central portion of the medium, in the medium conveying direction A2, i.e., so that it is easily determined that multi-feed of the medium has occurred in the end portion on the rear end side of the medium than the center portion of the medium.

In addition, when a medium to which a label (seal) or a small size paper piece (a photograph, a cutout, a postage stamp, etc.) is adhered, is conveyed, the medium conveying apparatus 100 may erroneously determine that multi-feed has occurred. In general, an adhered position at which the label or the small size paper piece, etc., is adhered in such medium is on the central side, and it is unlikely that the label or the small size paper piece, etc., is adhered to around the end portion. Therefore, the determination sensitivity of each area is set so that the determination sensitivity in the end portion of the medium is higher than the determination sensitivity in the center portion of the medium, in the medium conveying direction A2, i.e., so that it is easily determined that multi-feed of the medium has occurred in the end portion of the medium than the center portion of the medium. In addition, the determination sensitivity of each region is set so that the determination sensitivity in the end portion of the medium is higher than the determination sensitivity in the central portion of the medium, in the width direction A4 perpendicular to the medium conveying direction, i.e., so that it is easily determined that multi-feed of the medium has occurred in the end portion of the medium than the center portion of the medium.

When determining whether or not multi-feed of the medium has occurred based on the transmission information (the size of the ultrasonic wave), The medium conveying apparatus 100 increases the determination sensitivity by increasing the determination threshold. Further, the medium conveying apparatus 100 increases the determination sensitivity by lengthening the determination interval if it determines that multi-feed of the medium has occurred when overlap of the medium is detected continuously for the determination period (predetermined period). On the other hand, the medium conveying apparatus 100 increases the determination sensitivity by shortening the determination interval if it determines that multi-feed of the medium has occurred when overlap of the medium is detected a predetermined number of times, which is one or more. In addition, the medium conveying apparatus 100 increases the determination sensitivity by shortening the calculation time when it calculates the statistical value from the measured value measured within the calculation time. Further, the medium conveying apparatus 100 increases the determination sensitivity by shortening the determination period when it determines that multi-feed of the medium has occurred when overlap of the medium is detected continuously for the determination period.

At least one parameter from among the determination threshold, the determination interval, the calculation time and the determination period, may be changed according to the position in the medium, and the other parameter may be a fixed value. In that case, the parameter changed according to the position in the medium may be specified by the user using the operating device 105 or the information processing apparatus.

Figure 8:
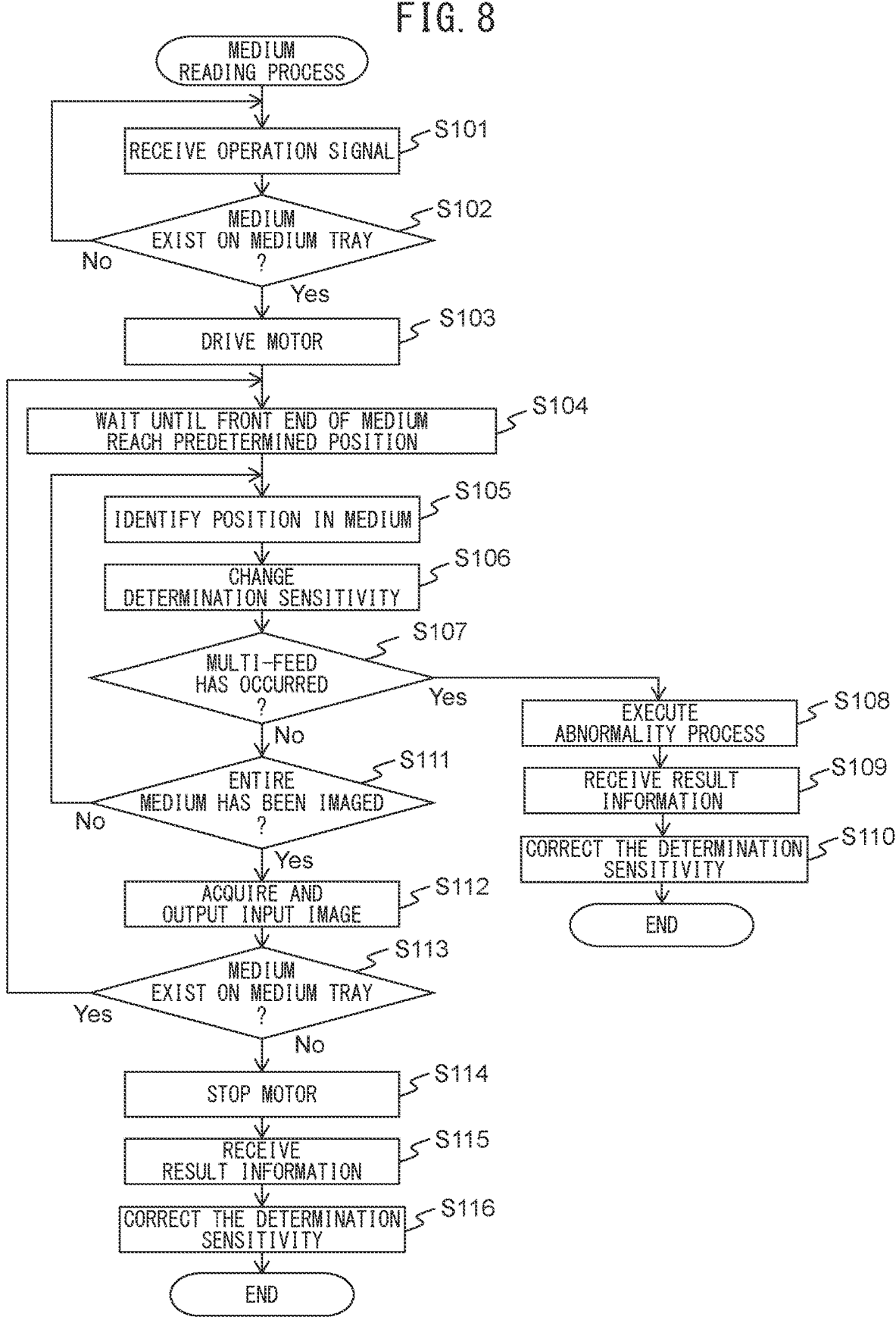
FIG. 8 is a flowchart illustrating an operation example of a medium reading process.

FIG. 8 is a flowchart illustrating an operation example of the medium reading process.

Referring to the flowchart illustrated in FIG. 8, an operation example of the medium reading process in the medium conveying apparatus 100 will be described below. The operation flow described below is executed mainly by the processing circuit 150 in cooperation with each element in the medium conveying apparatus 100, in accordance with a program previously stored in the storage device 140.

First, the control module 151 stands by until an instruction to read a medium is input by the user by use of the operation device 105 or the information processing apparatus, and an operation signal instructing to read the medium is received from the operation device 105 or the interface device 132 (step S101). The operation signal includes information relating to a job specified by the user. The job is a setting relating to an image reading process, and is set for each type of the medium (general paper, business card, photograph, etc.) to be read, for example. The job includes settings such as a size of the conveyed medium, color setting of the generated input image (color/gray scale/black and white, etc.), resolution (200 dpi/300 dpi/600 dpi, etc.), or reading surface (both sides/one side). When a plurality of media is placed on the medium tray 103 and conveyed together, the same job may be set for each medium, or different job may be set for each medium.

Next, the control module 151 acquires the first medium signal from the first medium sensor 111, and determines whether or not the medium is placed on the medium tray 103 based on the acquired first medium signal (step S102). When a medium is not placed on the medium tray 103, the control module 151 returns the processing to step S101 and waits until newly receiving an operation signal from the operation device 105 or the interface device 132.

On the other hand, when the medium is placed on the medium tray 103, the control module 151 drives the motor for moving the medium tray 103 to move the medium tray 103 to a position capable of feeding the medium. The control module 151 drives the motor 131 to rotate the pick roller 112, the feed roller 113, the brake roller 114, and the first to eighth conveyance rollers 117*a* to 117*h* to feed and convey the medium placed on the medium tray 103 (step S103).

Next, the determination module 152 waits until the front end of the conveyed medium reaches the position of the ultrasonic sensor 116 (step S104). The determination module 152 acquires the second medium signal periodically from the second medium sensor 115, and determines that the front end of the medium passed through the position of the second medium sensor 115 when a signal value of the second medium signal changes from a value indicating that a medium does not exist to a value indicating that a medium exists. Then, the determination module 152 determines that the front end of the medium has reached the position of the ultrasonic sensor 116 when a predetermined time has elapsed since it determines that the front of the medium passed through the position of the second medium sensor 115. The determination module 152 may determine that the front end of the medium has reached the position of the ultrasonic sensor 116 when a predetermined time has elapsed since the start of feeding of the medium.

Next, the determination module 152 identifies the position currently facing the ultrasonic sensor 116 in the conveyed medium in the medium conveying direction A2 (step S105). The determination module 152 identifies a distance from the front end of the medium to the position facing the ultrasonic sensor 116, based on the time elapsed (or the number of steps by which the motor 131 has been driven) since it is determined that the front end of the medium reached the position of the ultrasonic sensor 116. Based on the specified distance and the size of the medium included in the job specified by the user, the determination module 152 identifies a distance from the rear end of the medium to the position facing the ultrasonic sensor 116. In a multi-feed determination process to be described later, which is executed in parallel with the medium reading process, the detection module 153 detects the transmission information of the ultrasonic wave transmitted through the medium at a plurality of positions in the medium conveyed by the conveying module based on the ultrasonic signal received from the ultrasonic sensor 116. In other words, the position currently facing the ultrasonic sensor 116 in the conveyed medium, corresponds to a position in the medium at which the transmission information has been detected by the detection module 153.

Next, the determination module 152 changes the determination sensitivity of whether or not multi-feed of the medium has occurred, according to the position currently facing the ultrasonic sensor 116 in the conveyed medium (step S106). The determination module 152 reads out the sensitivity table and identifies the sensitivity setting value corresponding to the identified position in the medium conveying direction A2 for each position of the width direction A4 corresponding to the plurality of ultrasonic sensors 116, to set the identified sensitivity setting value to each parameter of the determination sensitivity. In other words, the determination module 152 changes the determination sensitivity by changing the determination threshold, the determination interval, the calculation time and/or the determination period, according to the position currently facing the ultrasonic sensor 116 in the conveyed medium. In particular, the determination module 152 changes the determination sensitivity so that the determination sensitivity in the end portion of the medium is higher than the determination sensitivity in the central portion of the medium in the medium conveying direction A2 and/or the width direction A4 perpendicular to the medium conveying direction.

The determination module 152 can improve the determination accuracy of the occurrence of multi-feed of the medium by changing each parameter according to the position in the medium.

Next, the determination module 152 determines whether or not it is determined that multi-feed of the medium has occurred in the multi-feed determination process (step S107).

When it is determined that multi-feed of the medium has occurred in the multi-feed determination process, the control module 151 executes an abnormality process (step S108). The control module 151 stops the motor 131 to stop feeding and conveying the medium by the conveying roller, as the abnormality process. Further, the control module 151 displays information indicating that multi-feed of the medium has occurred on the display device 106 or transmits the information to the information processing apparatus via the interface device 132, to notify the user, as the abnormality process. The control module 151 may stop the medium reading process after ejecting the currently conveyed medium, as the abnormality process. Further, the control module 151 may drive the motor 131, to control the conveying roller so as to re-feed after returning the medium once to the medium tray 103 by reverse feeding the medium, as the abnormality process. Thus, the user does not need to re-place the medium on the medium tray 103 and re-feed, and thereby, the control module 151 can improve convenience to the user.

Next, the reception module 154 receives, from the user, result information indicating whether or not the determination result of multi-feed of the medium by the determination module 152 was correct (step S109). The reception module 154 receives the result information input by the user using the operation device 105 or the information processing apparatus, from the operation device 105 or the interface device 132. The reception module 154 stores the received result information in the storage device 140 in association with the area at which it is determined that multi-feed has occurred.

Next, the determination module 152 corrects the determination sensitivity at each position in the medium based on the result information (step S110), and ends series of steps. For example, the determination module 152 corrects each sensitivity setting value so that the determination sensitivity in the area in which it is determined that multi-feed has occurred is lower than the current determination sensitivity when the result information indicates that the determination result of multi-feed of the medium was incorrect. The determination module 152 may correct the determination sensitivity based on the two or more items of result information received after each sensitivity setting value is last updated. In that case, the determination module 152 corrects each sensitivity setting value so that the determination sensitivity in the area is lower than the current determination sensitivity when the number or the ratio of the result information indicating that the determination result of multi-feed of the medium was incorrect, among the most recent predetermined number of the result information, exceeds a predetermined threshold. Thus, the medium conveying apparatus 100 can appropriately set the determination sensitivity for a specific type of medium frequently conveyed by itself.

The determination module 152 may correct each sensitivity setting value so that the determination sensitivity in the area in which it is determined that multi-feed has occurred is higher than the current determination sensitivity when the result information indicates that the determination result of multi-feed of the medium was correct. However, since it may be frequently erroneously determined that multi-feed of the medium has occurred if the determination sensitivity is too high, the upper limit may be provided in each sensitivity setting value.

Further, the predetermined threshold may be set by the user. Thus, the medium conveying apparatus 100 can change which of reliably detecting the occurrence of multi-feed or reducing the processing time of the medium reading process is emphasized, according to the user's application. Therefore, the medium conveying apparatus 100 can improve convenience to the user. Further, the determination module 152 may correct only a part of the sensitivity setting value, rather than correcting all the sensitivity setting values. Further, the medium conveying apparatus 100 may transmit the result information and the area corresponding to the result information, or the corrected sensitivity setting value of each area to the other medium conveying apparatus. The other medium conveying apparatus may correct the sensitivity setting value of itself based on the information. Thus, the medium conveying apparatus 100 can share the determination result of multi-feed with other medium conveying apparatus to further improve the determination accuracy of multi-feed of the medium.

On the other hand, in step S107, when it is determined that multi-feed of the medium has not occurred in the multi-feed determination process, the control module 151 determines whether or not the entire medium has been imaged (step S111). The control module 151, for example, determines whether or not the rear end of the medium has passed through the position of the second medium sensor 115 based on the second medium signal received from the second medium sensor 115. The control module 151 acquires the second medium signal periodically from the second medium sensor 115. The control module 151 determines that the rear end of the medium has passed through the position of the second medium sensor 115 when the signal value of the second medium signal changes from a value indicating that a medium exists to a value indicating that there is no medium. The control module 151 determines that the rear end of the medium passes through the imaging position of the imaging device 119, and the entire medium has been imaged when a predetermined time has elapsed after the rear end of the medium passed through the position of the second medium sensor 115. The control module 151 may determine the entire conveyed medium has been imaged when a predetermined time has elapsed since the start of feeding of the medium.

When the entire conveyed medium has not been imaged, the control module 151 returns the process to step S105 and repeats the processes in step S105 to S111.

On the other hand, when the entire conveyed medium has been imaged, the control module 151 acquires the input image from the imaging device 119, and outputs by transmitting the acquired input image to the information processing apparatus via the interface device 132 (step S112).

Next, the control module 151 determines whether or not the medium remains on the medium tray 103 based on the first medium signal received from the first medium sensor 111 (step S113). When a medium remains on the medium tray 103, the control module 151 returns the process to step S104 and repeats the processes in steps S104 to S113.

On the other hand, when a medium does not remain on the medium tray 103, the control module 151 stops the motor 131 (step S114).

Next, in the same manner as in step S109, the reception module 154 receives, from the user, the result information indicating whether or not the determination result of multi-feed of the medium by the determination module 152 was correct (step S115). When the determination result of multi-feed of the medium was incorrect, the reception module 154 further receives the specification of the area (position) in the medium where multi-feed of the medium has occurred, from the user. The reception module 154 stores the received result information in the storage device 140 in association with an area in which multi-feed has occurred.

Next, the determination module 152 corrects the determination sensitivity at each position in the medium based on the result information (step S116), and ends series of steps. For example, when the result information indicates that the determination result of multi-feed of the medium was incorrect, the determination module 152 corrects each sensitivity setting value so that the determination sensitivity in the area in which it is determined that multi-feed has occurred is higher than the current determination sensitivity. In other words, the determination module 152 corrects the sensitivity setting value when it is determined that multi-feed of the medium has not occurred even though multi-feed has occurred. The determination module 152 may correct the determination sensitivity based on the two or more items of result information received after each sensitivity setting value is last updated. In that case, the determination module 152 corrects each sensitivity setting value so that the determination sensitivity in the area is higher than the current determination sensitivity when the number or the ratio of the result information indicating that the determination result of multi-feed of the medium was incorrect, among the most recent predetermined number of the result information, exceeds a predetermined threshold. Thus, the medium conveying apparatus 100 can appropriately set the determination sensitivity for a specific type of medium frequently conveyed by itself.

Either or both of steps S109 to S110 and steps S115 to S116 may be omitted.

Figure 9:
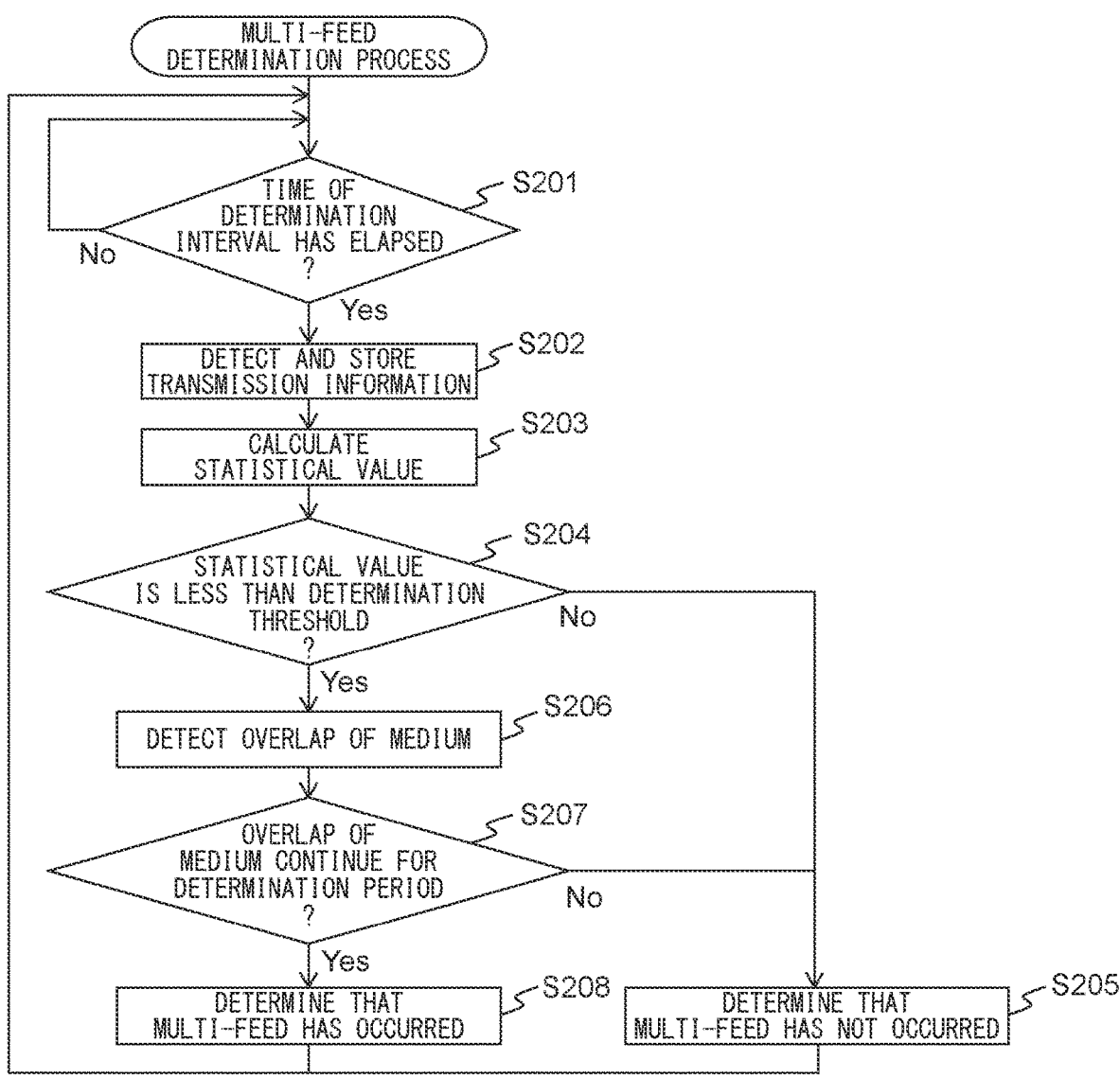
FIG. 9 is a flowchart illustrating an operation example of a multi-feed determination process.

FIG. 9 is a flowchart illustrating an operation example of the multi-feed determination process of the medium conveying apparatus 100.

Referring to the flowchart illustrated in FIG. 9, an operation example of the multi-feed determination process in the medium conveying apparatus 100 will be described below. The operation flow described below is executed mainly by the processing circuit 150 in cooperation with each element in the medium conveying apparatus 100, in accordance with a program previously stored in the storage device 140. The operation flow shown in FIG. 9 is periodically executed during medium conveyance. The operation flow shown in FIG. 9 is executed independently, corresponding to each of the plurality of ultrasonic sensors 116.

First, the detection module 153 determines whether or not the time of the determination interval has elapsed after previously determining whether or not multi-feed has occurred (step S201). This determination interval is the determination interval set for a position currently facing the corresponding ultrasonic sensor 116 in the conveyed medium in the latest process of step S106. The detection module 153 waits until the time of the determination interval has elapsed after previously determining whether or not multi-feed has occurred. Incidentally, if this is immediately after conveying the medium (first time), the determination module 152 omits the process of step S201, and proceeds the process to step S202.

When the time of the determination interval has elapsed after previously determining whether or not multi-feed has occurred, the detection module 153 receives the ultrasonic signal from the ultrasonic sensor 116. The detection module 153 detects the transmission information indicated in the received ultrasonic signal as the transmission information of the ultrasonic wave transmitted through the conveyed medium, at a position currently facing the corresponding ultrasonic sensor 116 in the medium, and stores it in the storage device 140 (step S202).

Thus, the detection module 153 detects each transmission information by each ultrasonic sensors 116 for each determination interval during conveying the medium, and detects the transmission information of the ultrasonic wave transmitted through the medium at a plurality of positions in the medium conveyed by the conveying module.

Next, the determination module 152 calculates a statistical value of the transmission information detected by the detection module 153 within the calculation time (step S203). This calculation time is the calculation time set for a position currently facing the corresponding ultrasonic sensor 116 in the conveyed medium in the latest process of step S106. The determination module 152 reads the transmission information detected within the calculation time from the storage device 140 and calculates the average value, the median value, the maximum value, or the minimum value of the read transmission information as the statistical value. The statistical value of the transmission information detected within the calculation time by the detection module 153 is an example of a value based on the transmission information.

Next, the determination module 152 determines whether or not the calculated statistical value is less than the determination threshold (step S204). This determination threshold is the determination threshold set for a position currently facing the corresponding ultrasonic sensor 116 in the conveyed medium in the latest process of step S106.

When the statistical value is equal to or more than the determination threshold, the determination module 152 determines that multi-feed of the medium has not occurred (step S205), and returns the process to step S201.

On the other hand, when the statistical value is less than the determination threshold, the determination module 152 determines that overlap of the medium has occurred at a position currently facing the corresponding ultrasonic sensor 116 in the conveyed medium (step S206).

Next, the determination module 152 determines whether or not it is determined that overlap of the medium has occurred, continuously for the determination period (step S207). In other words, the determination module 152 determines whether or not, a length of the area in which the medium is overlapped is equal to or more than a predetermined length corresponding to the determination period. This determination period is the determination period set for a position currently facing the corresponding ultrasonic sensor 116 in the conveyed medium, in the latest process of step S106.

When the period in which overlap of the medium has occurred, is less than the determination period, the determination module 152 determines that multi-feed of the medium has not occurred (step S205), and returns the process to step S201.

On the other hand, when it is determined that overlap of the medium has occurred, continuously for the determination period, i.e., when overlap of the medium has been detected continuously for the determination period, the determination module 152 determines that multi-feed of the medium has occurred (step S208), and returns the process to step S201. In this case, it is determined that multi-feed has occurred in step S107 of FIG. 8, and the abnormality process is executed in step S108.

Thus, the determination module 152 determines whether or not multi-feed of the medium has occurred, by comparing the statistical value of the transmission information detected by the detection module 153 at the predetermined intervals, with the threshold, for each of a plurality of positions at which the transmission information has been detected by the detection module 153 in the medium. In particular, the determination module 152 determines whether or not overlap of the medium has occurred, by comparing the statistical value of the transmission information detected by the detection module 153 at the predetermined intervals, with the threshold, for each of a plurality of positions in the medium at which the transmission information has been detected by the detection module 153 in the medium. The determination module 152 determines that multi-feed of the medium has occurred when it is determined that overlap of the medium has occurred, continuously for the predetermined period.

Incidentally, the process of step S203 may be omitted, and the determination module 152 may determine whether or not multi-feed of the medium has occurred, by comparing the transmission information itself with the determination threshold in step S204. In that case, the transmission information is an example of a value based on the transmission information. Further, the process of step S207 may be omitted, the determination module 152 may determine that multi-feed of the medium has occurred when overlap of the medium has been detected even once. In addition, when the fixed value is used as any parameter among the determination threshold, the determination interval, the calculation time and the determination period, the fixed value is used as the parameter in step S201, S203, S204 or S207.

The transmission information may indicate the magnitude of a shift of a phase of the ultrasonic wave received by the ultrasonic receiver 116b with respect to a phase of the ultrasonic wave transmitted by the ultrasonic transmitter 116a, instead of the magnitude of the ultrasonic wave received by the ultrasonic receiver 116b. The shift of the phase of the ultrasonic wave passing through the media when the media overlaps, is larger than the shift of the phase when a medium does not overlap. Therefore, when the magnitude of the shift of the phase of the ultrasonic wave is used as the transmission information, the medium conveying apparatus 100 increases the determination sensitivity by lowering the determination threshold. Further, in step S204, the determination module 152 determines that multi-feed has not occurred when the statistical value is less than the determination threshold, and it determines that overlap of the medium has occurred when the statistical value is equal to or more than the determination threshold.

Further, in step S105 of FIG. 8, the determination module 152 may identify the size of the medium from the input image using a known image processing technique, rather than identifying the size of the medium based on the job specified by the user. Alternatively, the medium conveying apparatus 100 may have a plurality of second medium sensors 115 spaced and located along the width direction A4, the determination module 152 may identify the size of the medium based on the second medium signal received from the plurality of second medium sensors 115. As another option, the determination module 152 may identify the size of the medium based on the transmission information received from the plurality of ultrasonic sensors 116 spaced and located along the width direction A4. In those cases, the processes in steps S105 to S110 is executed after acquiring the input image in step S112. Further, in the multi-feed determination process, the detection module 153 periodically acquires the transmission information, and stores the transmission information in the storage device 140 in association with the position at which the transmission information has been detected, (the position from the front end) in the medium. After identifying the size of the medium, the determination module 152 determines whether or not multi-feed of the medium has occurred according to the determination sensitivity corresponding to each position, based on the transmission information at each position in the medium stored in the storage device 140.

Figure 10:
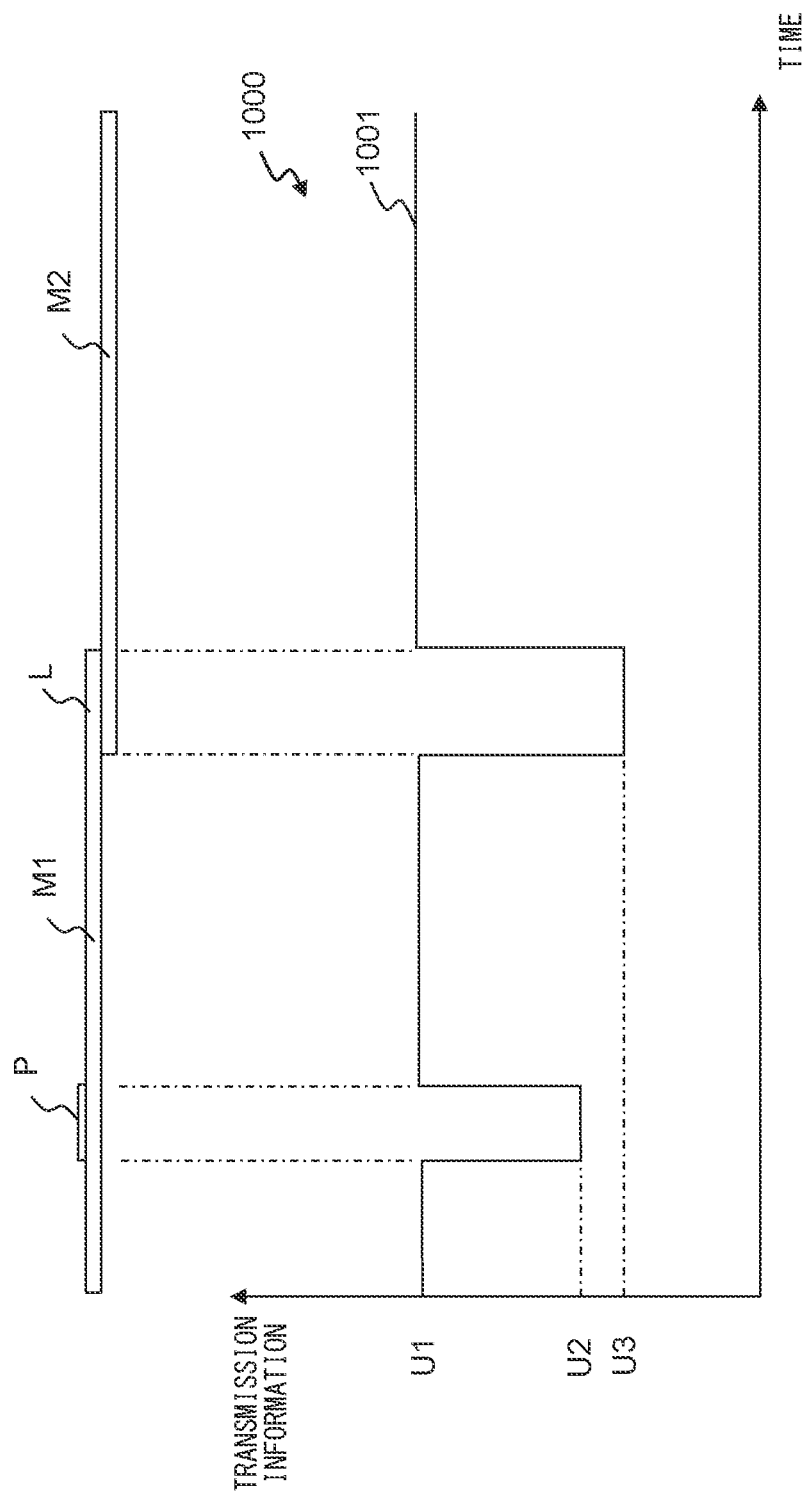
FIG. 10 is a schematic diagram for illustrating a technical significance.

FIG. 10 is a schematic diagram for illustrating the technical significance of changing the determination sensitivity according to the position in the medium when determining whether or not multi-feed of the medium has occurred based on the transmission information.

FIG. 10 is graph 1000 showing characteristics of the transmission information (the magnitude of the ultrasonic wave). In graph 1000, a solid line 1001 indicates the characteristics of the transmission information (the magnitude of the ultrasonic wave) when a paper M1 and a paper M2 are conveyed in an overlapped state. The paper M1 is a paper to which a photograph P is adhered, and an end portion L on the rear end side of the paper M1 is conveyed in an overlapped state with an end portion on the front end side of the paper M2. The horizontal axis indicates time, and the vertical axis indicates a value of the transmission information, in graph 1000. In the area to which the photograph P is adhered in the paper M1, the value of the transmission information decreases. Similarly, the value of the transmission information decreases also in the portion L in which the paper M1 and the paper M2 overlap.

When the determination threshold is set between a value U1 of the transmission information in the area in which a sheet of paper exists and a value U2 of the transmission information in the area to which the photograph is adhered in the sheet, it may be erroneously determined that multi-feed has occurred in the area to which the photograph is adhered in the sheet. However, the value U2 of the transmission information in the area to which the photograph is adhered in the paper and a value U3 of the transmission information in the area in which the two sheets overlap are approximate to each other. Therefore, when the determination threshold is set to a value lower than the value U2 of the transmission information in the area to which the photograph is adhered in the paper, it may be erroneously determined that multi-feed of the medium has not occurred when the two sheets are conveyed in an overlapped state.

The medium conveying apparatus 100 has the high determination sensitivity in the end portion to which the photograph is unlikely to be adhered in the medium, and has the low determination sensitivity in the center portion to which the photograph is likely to be adhered in the medium. Thus, the medium conveying apparatus 100 can reliably detect the occurrence of multi-feed at the end portion in the paper when the two sheets are conveyed in an overlapped state, while suppressing erroneous determination that multi-feed has occurred in the area to which the photograph is adhered in the paper. Further, the medium conveying apparatus 100 has the high determination sensitivity in the end portion on the front end side in the medium. Thus, the medium conveying apparatus 100 can detect the occurrence of multi-feed of the medium at an early stage and suppress the occurrence of damage to the medium or the medium conveying apparatus 100 when stapled media or a medium whose end portion is folded is conveyed.

As described in detail above, the medium conveying apparatus 100 determines whether or not multi-feed of the medium has occurred based on the transmission information of the ultrasonic waves detected at a plurality of positions in the conveyed medium, and changes the determination sensitivity of multi-feed according to the position in the medium. Thus, the medium conveying apparatus 100 can determine whether or not multi-feed of the medium has occurred with higher accuracy.

In particular, the medium conveying apparatus 100 can suppress erroneously determination that multi-feed has occurred, and stopping the conveyance of the medium when the medium to which the label or the small size paper piece is adhered has been conveyed. Thus, the medium conveying apparatus 100 can suppress an increase in the total time required for the medium reading process. Further, the user does not need to re-place the medium on the medium tray 103 and cause the medium conveying apparatus 100 to re-convey it. Therefore, the medium conveying apparatus 100 can improve convenience to the user.

Further, the medium conveying apparatus 100 changes the determination sensitivity of multi-feed according to the position in the medium, rather than omitting (not executing) determining whether or not multi-feed of the medium has occurred at a specific position such as the central portion of the medium. Therefore, the medium conveying apparatus 100 can detect the occurrence of multi-feed of the medium, for example, when the PPC (Plain Paper Copier) paper, etc., is conveyed, even when the small medium, such as a business card, a receipt, etc., is conveyed in an overlapped state only in the central portion.

Figure 11:
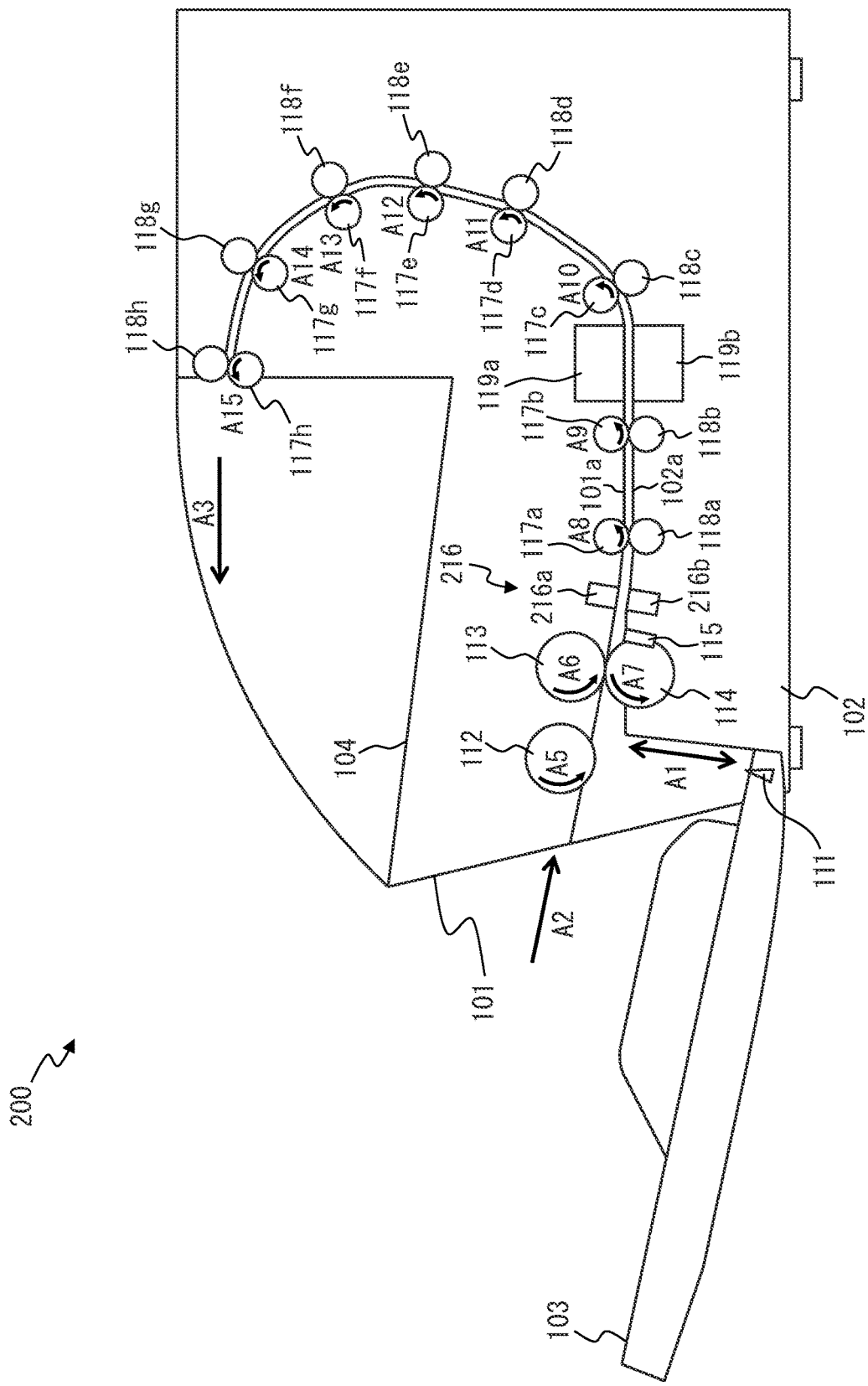
FIG. 11 is a diagram for illustrating a conveyance path inside another medium conveying apparatus 200.

FIG. 11 is a diagram for illustrating a conveyance path inside a medium conveying apparatus 200 according to another embodiment.

As shown in FIG. 11, the medium conveying apparatus 200 includes the respective portions of the medium conveying apparatus 100. However, the medium conveying apparatus 200 includes a thickness sensor 216 instead of the ultrasonic sensor 116.

The thickness sensor 216 is located on the downstream side of the feed roller 113 and the brake roller 114 and on the upstream side of the first to eighth conveyance rollers 117a to 117h and the first to eighth driven rollers 118a to 118h. The thickness sensor 216 includes a light emitter 216a and a light receiver 216b. The light emitter 216a and the light receiver 216b are located close to the conveyance path of the medium in such a way as to face one another with the conveyance path in between. The light emitter 216a emits light (infrared light or visible light) toward the light receiver 216b. On the other hand, the light receiver 216b receives the light emitted by the light emitter 216a, and generates and outputs a thickness signal being an electric signal corresponding to the intensity of the received light. When a medium exists at the position of the thickness sensor 216, the light emitted by the light emitter 216a is attenuated by the medium. Therefore, as the thickness of the medium is larger, a signal value of the thickness signal is smaller. The thickness signal indicates the thickness information of the medium at a plurality of positions in the conveyed medium by the conveying roller. Similar to the ultrasonic sensor 116, a plurality of thickness sensors 216 may be spaced and located along in the width direction A4, respectively.

A reflected light sensor, a pressure sensor or a mechanical sensor may be used as the thickness sensor 216. The reflected light sensor includes a pair of light emitter and light receiver provided on one side with respect to a conveyance path of the medium and a pair of light emitter and light receiver provided on the other side. The reflected light sensor detects a distance between each pair and each surface of the medium, based on a time from when one pair emits light to one surface of the medium to when it receives the reflected light and a time from when the other pair emits light to the other surface of the medium to when it receives the reflected light. The reflected light sensor generates a thickness signal which indicates a subtracted value acquired by subtracting each detected distance from a distance between the two pairs, as the thickness information. The pressure sensor detects a pressure which changes according to the thickness of the medium, and generates a thickness signal which indicates the detected pressure, as the thickness information. The mechanical sensor detects a movement amount of a roller in contact with the medium, and generates a thickness signal which indicates the detected movement amount, as the thickness information.

The medium conveying apparatus 200 increases the determination sensitivity, by lowering the determination threshold when it determines multi-feed of the medium based on the thickness information (the thickness of the medium).

The medium conveying apparatus 200, similarly to the medium conveying apparatus 100, executes the medium reading process illustrated in FIG. 8. However, in step S104, the determination module 152 waits until the front end of the conveyed medium reaches the position of the thickness sensor 216. Further, in step S105, the determination module 152 identifies the position currently facing the thickness sensor 216 in the conveyed medium in the medium conveying direction A2. The position currently facing the thickness sensor 216 in the conveyed medium, corresponds to a position in the medium at which the thickness information has been detected by the detection module 153. Further, in step S106, the determination module 152 changes the determination sensitivity by changing the determination threshold, the determination interval, the calculation time, and/or, the determination period in the conveyed medium, according to the position currently facing the thickness sensor 216 in the conveyed medium.

Figure 12:
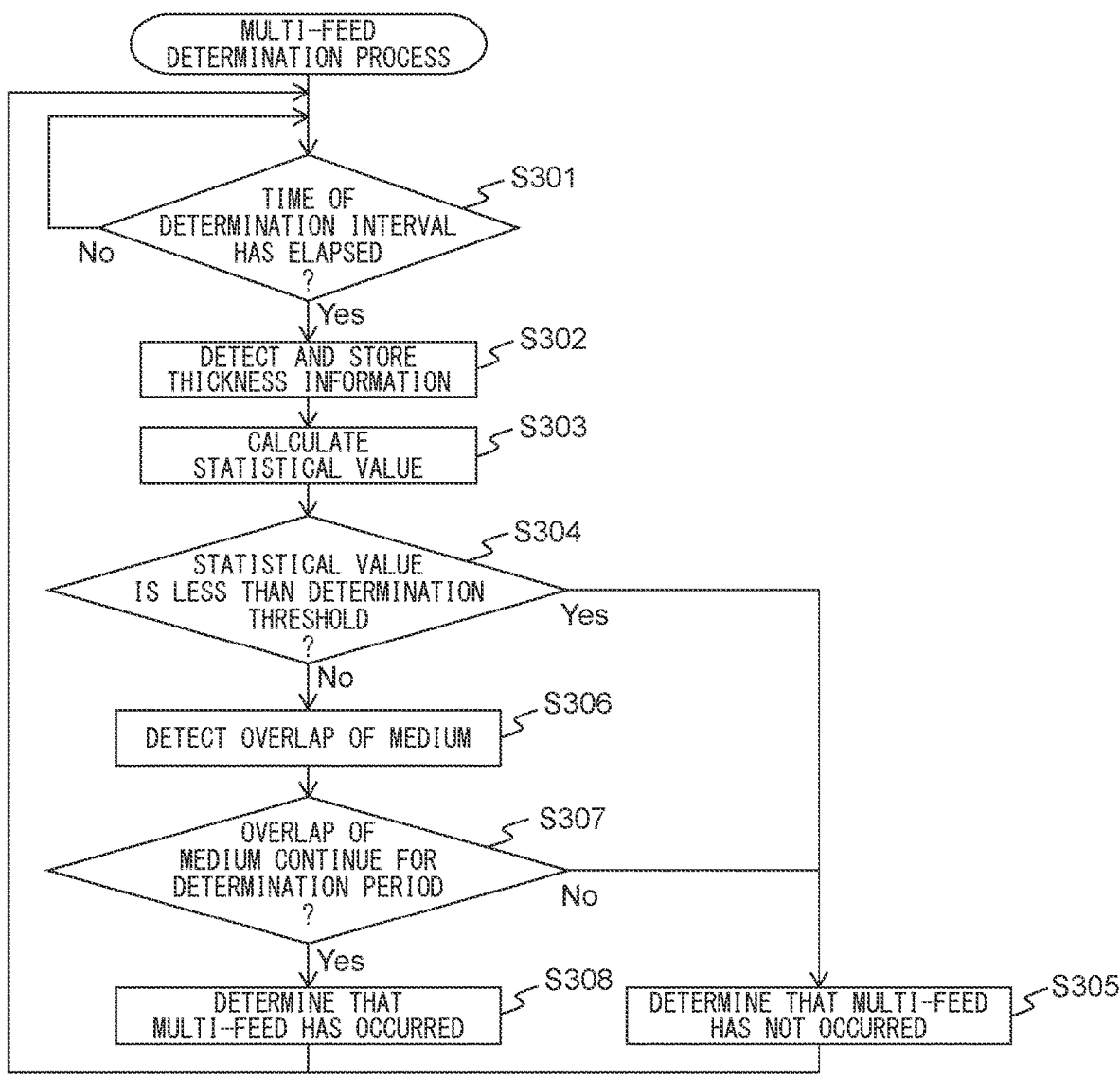
FIG. 12 is a flowchart illustrating an operation example of another multi-feed determination process.

FIG. 12 is a flowchart illustrating an operation example of the multi-feed determination process of the medium conveying apparatus 200.

The flowchart shown in FIG. 12 is executed instead of the flowchart shown in FIG. 9. Similar to the operation flow shown in FIG. 9, the operation flow shown in FIG. 12 is periodically executed during medium conveyance. The operation flow shown in FIG. 12 is executed independently, corresponding to each of the plurality of thickness sensors 216.

First, the detection module 153 determines whether or not the time of the determination interval has elapsed after previously determining whether or not multi-feed has occurred (step S301). This determination interval is the determination interval set for a position currently facing the corresponding thickness sensor 216 in the conveyed medium in the latest process of step S106. The detection module 153 waits until the time of the determination interval has elapsed after previously determining whether or not multi-feed has occurred. Incidentally, if this is immediately after conveying the medium (first time), the determination module 152 omits the process of step S301, and proceeds the process to step S302.

When the time of the determination interval has elapsed after previously determining whether or not multi-feed has occurred, the detection module 153 acquires the thickness signal from the thickness sensor 216. The detection module 153 detects the thickness information indicated in the acquired thickness signal as the thickness information of the medium at a position currently facing the corresponding thickness sensor 216 in the conveyed medium, and stores it in the storage device 140 (step S302).

Thus, the detection module 153 detects each thickness information by each thickness sensor 216 for each determination interval during conveying the medium, and detects the thickness information of the medium at a plurality of positions in the conveyed medium by the conveying module.

Next, the determination module 152 calculates a statistical value of the thickness information detected by the detection module 153 within the calculation time (step S303). This calculation time is the calculation time set for a position currently facing the corresponding thickness sensor 216 in the conveyed medium in the latest process of step S106. The determination module 152 reads the thickness information detected within the calculation time from the storage device 140 and calculates the average value, the median value, the maximum value, or the minimum value of the read thickness information as the statistical value. The statistical value of the thickness information detected within the calculation time by the detection module 153 is an example of a value based on the thickness information.

Next, the determination module 152 determines whether or not the calculated statistical value is less than the determination threshold (step S304). This determination threshold is the determination threshold set for a position currently facing the corresponding thickness sensor 216 in the conveyed medium in the latest process of step S106.

When the statistical value is less than the determination threshold, the determination module 152 determines that multi-feed of the medium has not occurred (step S305), and returns the process to step S301.

On the other hand, when the statistical value is equal to or more than the determination threshold, the determination module 152 determines that overlap of the medium has occurred at a position facing the corresponding thickness sensor 216 in the conveyed medium (step S306).

Next, the determination module 152 determines whether or not it is determined that overlap of the medium has occurred, continuously for the determination period (step S307). This determination period is the determination period set for a position currently facing the corresponding thickness sensor 216 in the conveyed medium, in the latest process of step S106.

When the period in which overlap of the medium has occurred, is less than the determination period, the determination module 152 determines that multi-feed of the medium has not occurred (step S305), and returns the process to step S301.

On the other hand, when it is determined that overlap of the medium has occurred, continuously for the determination period, the determination module 152 determines that multi-feed of the medium has occurred (step S308), and returns the process to step S301.

Thus, the determination module 152 determines whether or not multi-feed of the medium has occurred, by comparing the statistical value of the thickness information detected by the detection module 153 at predetermined intervals with the threshold, for each of a plurality of positions at which the thickness information has been detected by the detection module 153, in the medium. In particular, the determination module 152 determines whether or not overlap of the medium has occurred, by comparing the statistical value of the thickness information detected by the detection module 153 at predetermined intervals with the threshold, for each of a plurality of positions at which the thickness information has been detected by the detection module 153, in the medium. The determination module 152 determines that multi-feed of the medium has occurred when it is determined that overlap of the medium has occurred, continuously for the predetermined period.

Incidentally, the process of step S303 may be omitted, and the determination module 152 may determine whether or not multi-feed of the medium has occurred, by comparing the thickness information itself with the determination threshold in step S304. In that case, the thickness information is an example of a value based on the thickness information. Further, the process of step S307 may be omitted, the determination module 152 may determine that multi-feed of the medium has occurred when overlap of the medium has been detected even once. In addition, when the fixed value is used as any parameter among the determination threshold, the determination interval, the calculation time and the determination period, the fixed value is used as the parameter in step S301, S303, S304 or S307.

Figure 13:
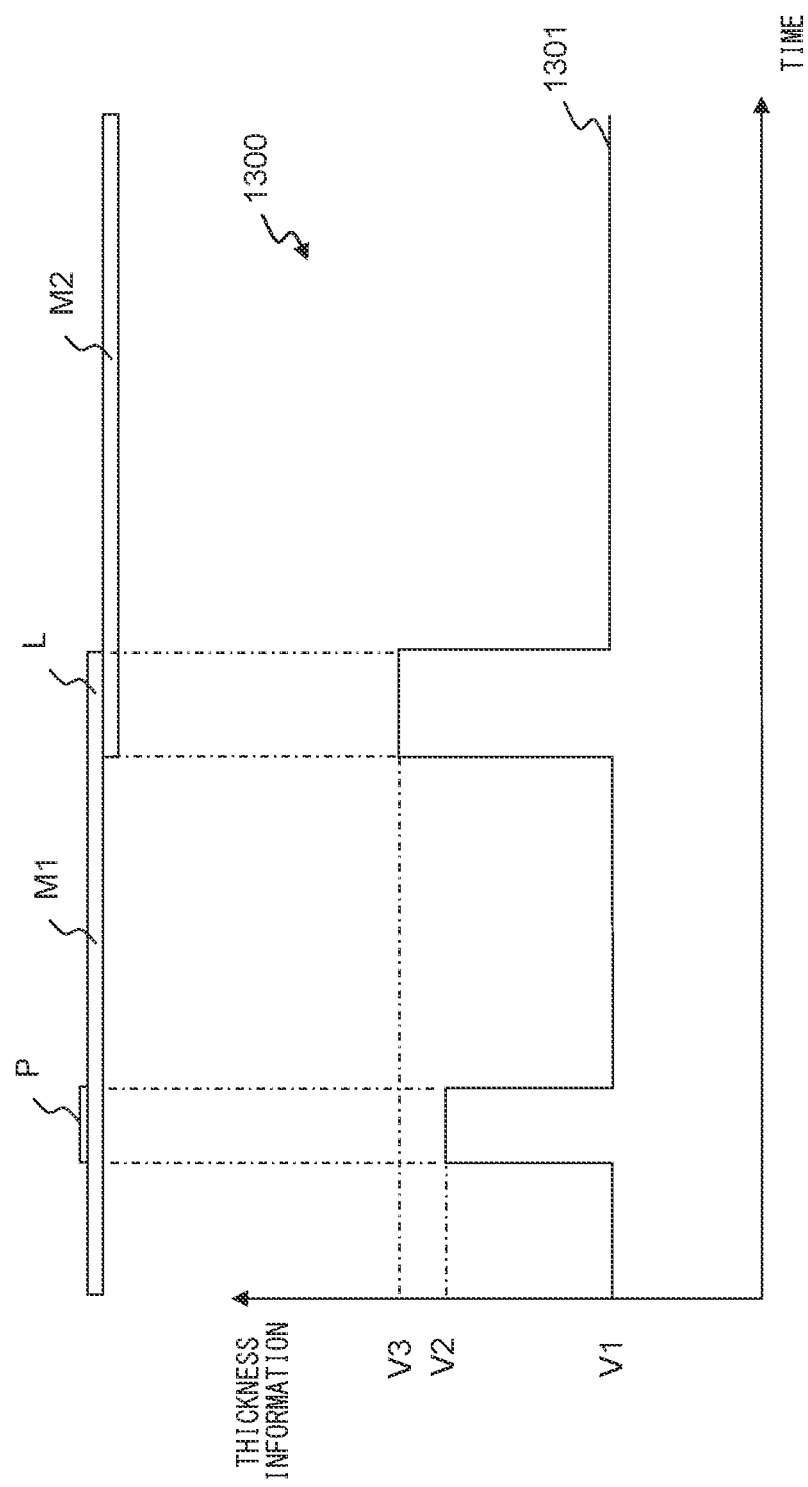
FIG. 13 is a schematic diagram for illustrating a technical significance.

FIG. 13 is a schematic diagram for illustrating the technical significance of changing the determination sensitivity according to the position in the medium when determining whether or not multi-feed of the medium has occurred based on the thickness information.

FIG. 13 is graph 1300 showing the characteristics of the thickness information (the thickness of the medium). In graph 1300, a solid line 1301 indicates the characteristics of the thickness information when the paper M1 and the paper M2 shown in FIG. 10 are conveyed in an overlapped state. The horizontal axis indicates time, and the vertical axis indicates a value of the thickness information, in graph 1300. In the area to which the photograph P is adhered in the paper M1, the value of the thickness information increases. Similarly, the value of the thickness information increases also in the portion L in which the paper M1 and the paper M2 overlap.

When the determination threshold is set between a value V1 of the thickness information in the area in which a sheet of paper exists and a value V2 of the thickness information in the area to which the photograph is adhered in the sheet, it may be erroneously determined that multi-feed has occurred in the area to which the photograph is adhered in the sheet. However, the value V2 of the thickness information in the area to which the photograph is adhered in the paper and a value V3 of the thickness information in the area in which the two sheets overlap are approximate to each other. Therefore, when the determination threshold is set to a value higher than the value V2 of the transmission information in the area to which the photograph is adhered in the paper, it may be erroneously determined that multi-feed of the medium has not occurred when the two sheets are conveyed in an overlapped state.

The medium conveying apparatus 100 has the high determination sensitivity in the end portion to which the photograph is unlikely to be adhered in the medium, and has the low determination sensitivity in the center portion to which the photograph is likely to be adhered in the medium. Thus, the medium conveying apparatus 100 can reliably detect the occurrence of multi-feed at the end portion in the paper when the two sheets are conveyed in an overlapped state, while suppressing erroneous determination that multi-feed has occurred in the area to which the photograph is adhered in the paper. Further, the medium conveying apparatus 100 has the high determination sensitivity in the end portion on the front end side in the medium. Thus, the medium conveying apparatus 100 can detect the occurrence of multi-feed of the medium at an early stage and suppress the occurrence of damage to the medium or the medium conveying apparatus 100 when stapled media or a medium whose end portion is folded, is conveyed.

As described in detail above, the medium conveying apparatus 200 determines whether or not multi-feed of the medium has occurred based on the thickness information of the medium detected at a plurality of positions in the conveyed medium, and changes the determination sensitivity of multi-feed according to the position in the medium. Thus, the medium conveying apparatus 100 can determine whether or not multi-feed of the medium has occurred with higher accuracy.

Figure 14:
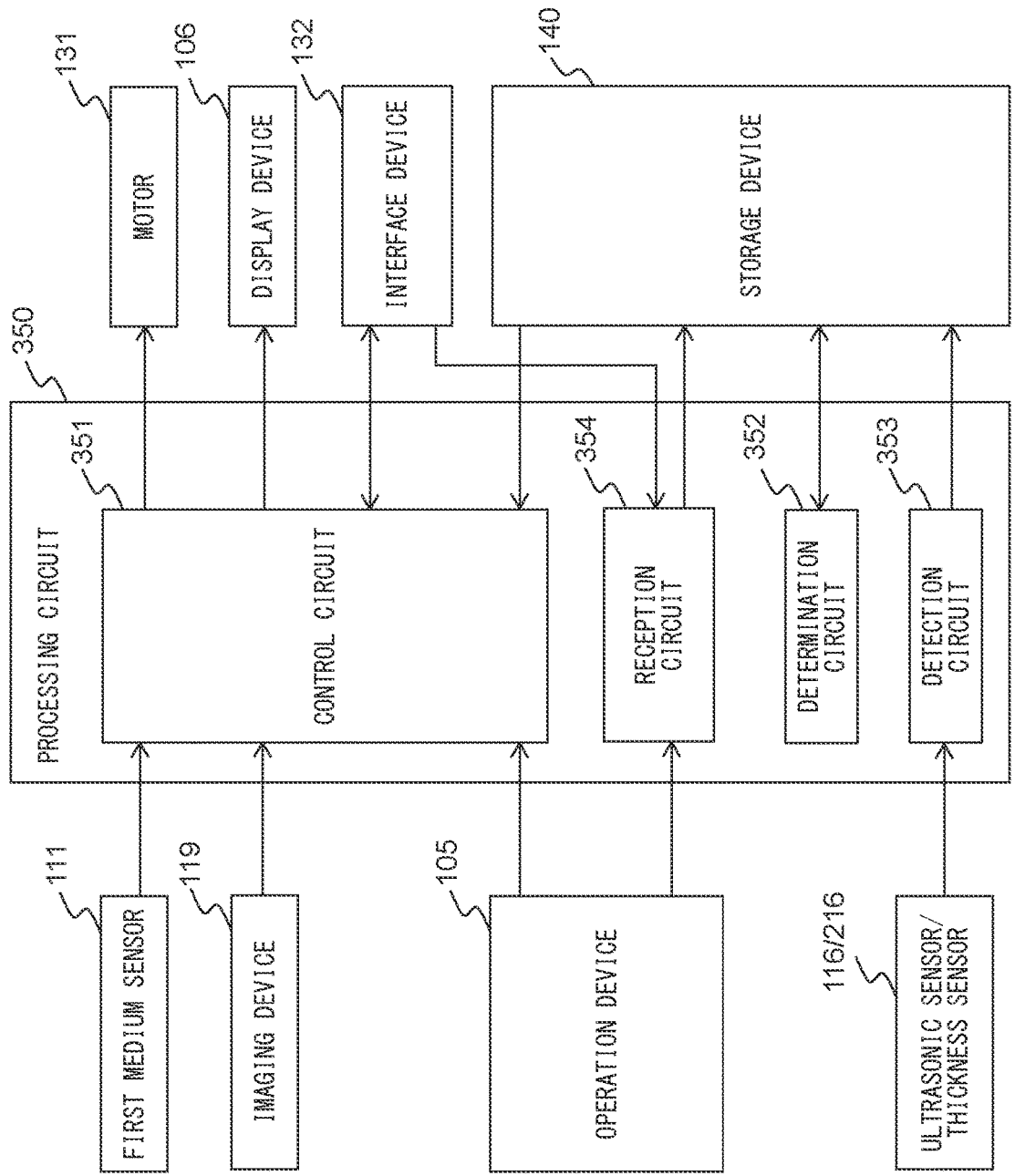
FIG. 14 is a diagram illustrating a schematic configuration of a processing circuit 350 in another medium conveying apparatus.

FIG. 14 is a diagram illustrating a schematic configuration of a processing circuit 350 of a medium conveying apparatus according to another embodiment.

The processing circuit 350 is used in place of the processing circuit 150 and executes the medium read process, etc., instead of the processing circuit 150. The processing circuit 350 includes a control circuit 351, a determination circuit 352, a detection circuit 353 and a reception circuit 354, etc. Note that each unit may be configured by an independent integrated circuit, a microprocessor, firmware, etc.

The control circuit 351 is an example of a control module, and has a function similar to the control module 151. The control circuit 351 receives an operation signal from the operation device 105 or the interface device 132, receives the first medium signal from the first medium sensor 111, and controls the motor 131 to convey the medium based on each received signal. The control circuit 351 acquires the input image from the imaging device 119, and outputs it to the interface device 132. Further, the control circuit 351 reads the determination result of whether or not multi-feed has occurred from the storage device 140, and executes the abnormality process when it is determined that multi-feed of the medium has occurred.

The determination circuit 352 is an example of a determination module has a functions similar to the determination module 152. The determination circuit 352 reads out a detection result of the transmission information or the thickness information at a plurality of positions in the medium and the determination sensitivity of multi-feed from the storage device 140, determines whether or not multi-feed of the medium has occurred based on the read detection result and the determination sensitivity, and stores the determination result in the storage device 140.

The detection circuit 353 is an example of a detection module, and has a function similar to the detection module 153. The detection circuit 353 receives the ultrasonic signal from the ultrasonic sensor 116 or the thickness signal from the thickness sensor 216, detects the transmission information or the thickness information at a plurality of positions of the medium based on the received signal, and stores it in the storage device 140.

The reception circuit 354 is an example of a reception module, and has a functions similar to the reception module 154. The reception circuit 354 receives the result information from the operation device 105 or the interface device 132, reads the determination sensitivity of multi-feed from the storage device 140, corrects the determination sensitivity of multi-feed based on the received result information, and stores it in the storage device 140.

As described in detail above, the medium conveying apparatus can determine whether or not multi-feed of the medium has occurred with higher accuracy even when the medium reading process and the multi-feed determination process are executed by the processing circuit 350.

REFERENCE SIGNS LIST 100, 200 medium conveying apparatus
112 pick roller
113 feed roller
114 brake roller
117a to 117h first to eighth conveyance rollers
118a to 118h first to eighth driven rollers
151 control module
152 determination module
153 detection module
154 reception module

What is claimed is:

1. A medium conveying apparatus comprising:
a conveying roller to convey a medium; and
a processor to
  detect transmission information of ultrasonic waves transmitted through the medium, or thickness information of the medium at a plurality of positions in the medium conveyed by the conveying roller,
  determine whether multi-feed of the medium has occurred, according to the transmission information or the thickness information, and a sensitivity value for each of the plurality of positions, and
  execute an abnormality process when it is determined that multi-feed of the medium has occurred, wherein
the processor sets the sensitivity value of each of the plurality of positions to a different value.

2. The medium conveying apparatus according to claim 1, wherein
the processor determines whether multi-feed of the medium has occurred, by comparing a value based on the transmission information or the thickness information with a threshold, for each of the plurality of positions, and wherein
the sensitivity value is the threshold.

3. The medium conveying apparatus according to claim 1, wherein
the processor determines whether multi-feed of the medium has occurred, by comparing a value based on the transmission information or the thickness information detected by the processor with a threshold at a predetermined interval, for each of the plurality of positions, and wherein
the sensitivity value is the predetermined interval.

4. The medium conveying apparatus according to claim 1, wherein
the processor determines whether or not multi-feed of the medium has occurred, by comparing a statistical value of the transmission information or the thickness information detected within a predetermined time by the processor with a threshold, for each of the plurality of positions, and wherein
the sensitivity value is the predetermined time.

5. The medium conveying apparatus according to claim 1, wherein
the processor determines that multi-feed of the medium has occurred when overlap of the medium has been detected continuously for a predetermined period, by comparing a value based on the transmission information or the thickness information detected by the processor, with a threshold, for each of the plurality of positions, and wherein
the sensitivity value is the predetermined period.

6. The medium conveying apparatus according to claim 1, wherein the processor sets the sensitivity value at each of the plurality of positions so that a sensitivity value in an end portion of the medium is higher than a sensitivity value in a center portion of the medium in a medium conveying direction.

7. The medium conveying apparatus according to claim 1, wherein the processor sets the sensitivity value at each of the plurality of positions so that a sensitivity value in an end portion of the medium is higher than a sensitivity value in a center portion of the medium in a direction perpendicular to a medium conveying direction.

8. The medium conveying apparatus according to claim 1, wherein
the processor receives, from a user, result information indicating whether a determination result of multi-feed of the medium by the processor was correct, and wherein
the processor corrects the sensitivity value at each position in the medium based on the result information.

9. A method for conveying a medium, the method comprising:
conveying a medium, by a conveying roller;
detecting transmission information of ultrasonic waves transmitted through the medium or thickness information of the medium at a plurality of positions in the medium conveyed by the conveying roller;
determining whether multi-feed of the medium has occurred, according to the transmission information or the thickness information, and a sensitivity value for each of the plurality of positions; and
executing an abnormality process when it is determined that multi-feed of the medium has occurred, wherein the sensitivity value of each of the plurality of positions is set to a different value.

10. The method according to claim 9, wherein
whether multi-feed of the medium has occurred, is determined by comparing a value based on the transmission information or the thickness information with a threshold, for each of the plurality of positions, and wherein
the sensitivity value is the threshold.

11. The method according to claim 9, wherein
whether multi-feed of the medium has occurred is determined, by comparing a value based on the transmission information or the thickness information detected with a threshold at a predetermined interval, for each of the plurality of positions, and wherein
the sensitivity value is the predetermined interval.

12. The method according to claim 9, wherein
whether or not multi-feed of the medium has occurred is determined, by comparing a statistical value of the transmission information or the thickness information detected within a predetermined time with a threshold, for each of the plurality of positions, and wherein
the sensitivity value is the predetermined time.

13. The method according to claim 9, wherein
it is determined that multi-feed of the medium has occurred when overlap of the medium has been detected continuously for a predetermined period, by comparing a value based on the transmission information or the thickness information detected, with a threshold, for each of the plurality of positions, and wherein
the sensitivity value is the predetermined period.

14. The method according to claim 9, wherein the sensitivity value at each of the plurality of positions is set to mutually different sensitivity value so that a sensitivity value in an end portion of the medium is higher than a sensitivity value in a center portion of the medium in a medium conveying direction.

15. A computer-readable, non-transitory medium storing executable instructions for conveying a medium, the executable instructions when executed by a processor performing a method, the method comprising:
detecting transmission information of ultrasonic waves transmitted through the medium or thickness information of the medium at a plurality of positions in the medium conveyed by a conveying roller;
determining whether multi-feed of the medium has occurred, according to the transmission information or the thickness information, and a sensitivity value for each of the plurality of positions; and
executing an abnormality process when it is determined that multi-feed of the medium has occurred, wherein
the sensitivity value of each of the plurality of positions is set to a different sensitivity value.

16. The computer-readable, non-transitory medium according to claim 15, wherein
whether multi-feed of the medium has occurred, is determined by comparing a value based on the transmission information or the thickness information with a threshold, for each of the plurality of positions, and wherein
the sensitivity value is the threshold.

17. The computer-readable, non-transitory medium according to claim 15, wherein
whether multi-feed of the medium has occurred is determined, by comparing a value based on the transmission information or the thickness information detected with a threshold at a predetermined interval, for each of the plurality of positions, and wherein
the sensitivity value is the predetermined interval.

18. The computer-readable, non-transitory medium according to claim 15, wherein
whether or not multi-feed of the medium has occurred is determined, by comparing a statistical value of the transmission information or the thickness information detected within a predetermined time with a threshold, for each of the plurality of positions, and wherein
the sensitivity value is the predetermined time.

19. The computer-readable, non-transitory medium according to claim 15, wherein
it is determined that multi-feed of the medium has occurred when overlap of the medium has been detected continuously for a predetermined period, by comparing a value based on the transmission information or the thickness information detected, with a threshold, for each of the plurality of positions, and wherein
the sensitivity value is the predetermined period.

20. The computer-readable, non-transitory medium according to claim 15, wherein the sensitivity value at each of the plurality of positions is set to different sensitivity value so that a sensitivity value in an end portion of the medium is higher than a sensitivity value in a center portion of the medium in a medium conveying direction.

* * * * *